US012339728B2

(12) United States Patent
Pappu et al.

(10) Patent No.: US 12,339,728 B2
(45) Date of Patent: Jun. 24, 2025

(54) DYNAMIC VOLTAGE AND FREQUENCY SCALING FOR DISCRETE GRAPHICS SYSTEMS

(71) Applicant: Intel Corporation, Santa Clara, CA (US)

(72) Inventors: Lakshminarayana Pappu, Folsom, CA (US); Phani Kumar Kandula, Bangalore (IN); Ali Ibrahim, Orinda, CA (US); Murali Ramadoss, Folsom, CA (US); Ankur Shah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 17/961,524

(22) Filed: Oct. 6, 2022

(65) Prior Publication Data

US 2023/0113953 A1    Apr. 13, 2023

(30) Foreign Application Priority Data

Oct. 7, 2021 (IN) .............................. 202141045676

(51) Int. Cl.
*G06F 1/32* (2019.01)
*G06F 1/3234* (2019.01)
*G06F 1/324* (2019.01)
*G06F 1/3296* (2019.01)

(52) U.S. Cl.
CPC .............. *G06F 1/325* (2013.01); *G06F 1/324* (2013.01); *G06F 1/3296* (2013.01)

(58) Field of Classification Search
CPC ......... G06F 1/325; G06F 1/324; G06F 1/3296
See application file for complete search history.

(56) References Cited

U.S. PATENT DOCUMENTS

| 9,104,421 | B2 | 8/2015 | Ahmad et al. |
| 10,014,869 | B1* | 7/2018 | Bowles ................... H03K 3/017 |
| 2017/0351316 | A1* | 12/2017 | Vratonjic ................. G06F 1/324 |
| 2019/0172510 | A1* | 6/2019 | Kim ...................... G11C 7/1066 |

OTHER PUBLICATIONS

RIT Scholar Works, "Design an dVerification of a DFI-AXI DDR4 Memory PHY Bridge Suitable for FPGA Based RTL 1 Emulation and Prototyping", Aug. 2019, 122 pages.

* cited by examiner

*Primary Examiner* — Stefan Stoynov
(74) *Attorney, Agent, or Firm* — Jaffery Watson Hamilton & DeSanctis LLP

(57) ABSTRACT

In one embodiment, a system on a chip integrated circuit (SoC) is provided that includes graphics processing resources including one or more graphics processing cores a memory subsystem including a memory controller, a physical interface, and a memory device and circuitry to dynamically adjust a voltage and frequency of the memory subsystem based on a workload executed by the graphics processing resources.

20 Claims, 27 Drawing Sheets

| PREFIX(ES) 1301 | OPCODE 1303 | ADDRESSING 1305 | DISPLACEMENT 1307 | IMMEDIATE 1309 |

DYNAMIC VOLTAGE AND FREQUENCY SCALING FOR DISCRETE GRAPHICS SYSTEMS

CROSS-REFERENCE

This application claims priority to India provisional patent application No. 202141045676, filed on Oct. 7, 2021, which is hereby incorporated herein by reference.

BACKGROUND

In some discrete graphics products, the memory subsystem can consume as much as 30% of the overall device power, depending on the workload being executed. As the device has a power budget, power that is consumed by the memory subsystem is not available to be used by the compute and render engines on the device. Excessive power consumption by the memory subsystem can reduce the performance of the compute and render components of the graphics device.

BRIEF DESCRIPTION OF THE DRAWINGS

The present invention is illustrated by way of example and not limitation in the figures of the accompanying drawings in which like references indicate similar elements, and in which.

DETAILED DESCRIPTION

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. The techniques and teachings described herein may be applied to a device, system, or apparatus including various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
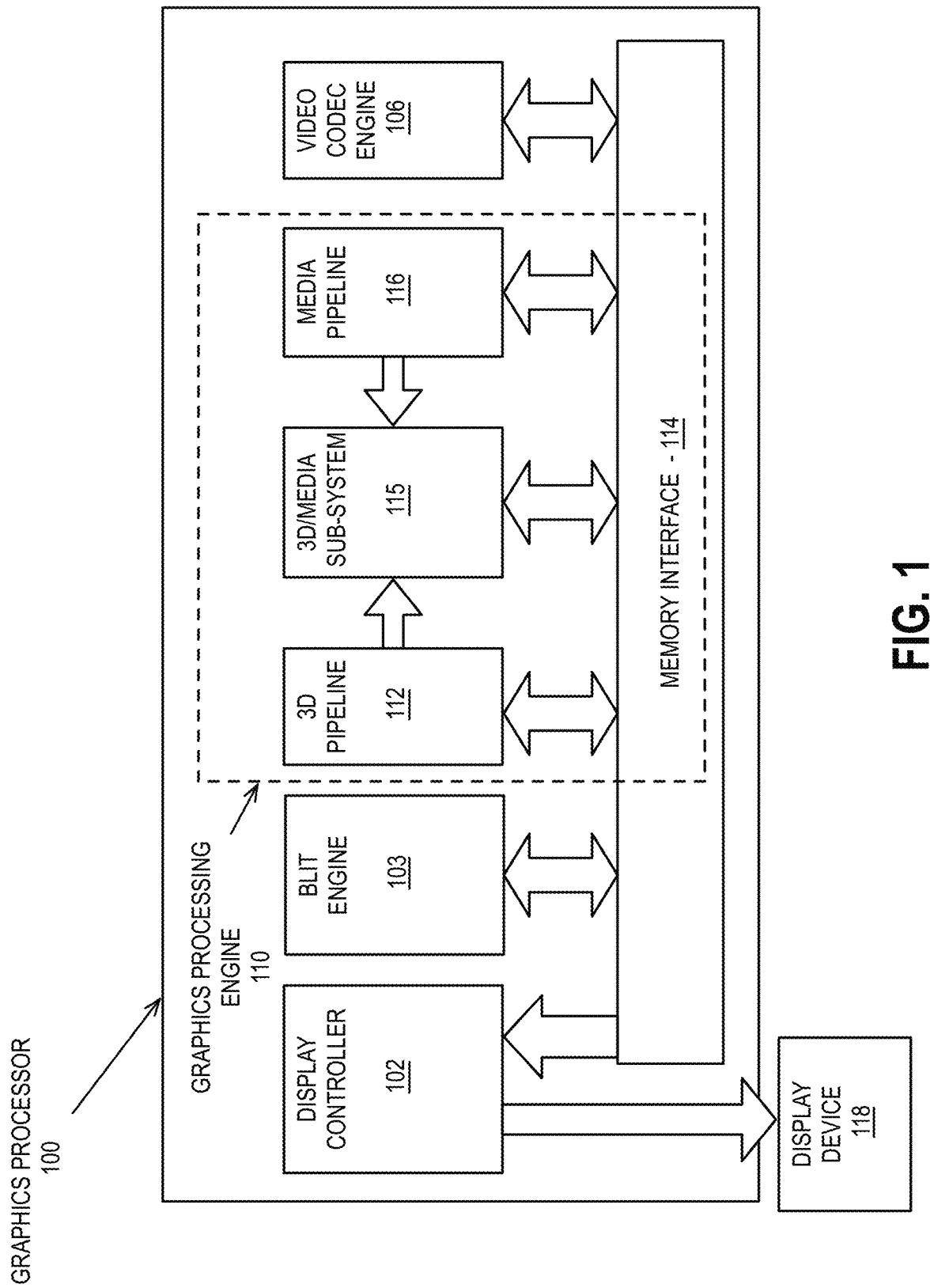
FIG. 1 is a block diagram of a graphics processor, according to an embodiment.

FIG. 1 is a block diagram of a graphics processor 100, according to an embodiment. The graphics processor 100 may be a discrete graphics processing unit, or may be a graphics processor integrated with a plurality of processing cores, or other semiconductor devices such as, but not limited to, memory devices or network interfaces. The graphics processor may communicate via a memory mapped I/O interface to registers on the graphics processor and with commands placed into the processor memory. Graphics processor 100 may include a memory interface 114 to access memory. Memory interface 114 can be an interface to local memory, one or more internal caches, one or more shared external caches, and/or to system memory.

Optionally, graphics processor 100 also includes a display controller 102 to drive display output data to a display device 118. Display controller 102 includes hardware for one or more overlay planes for the display and composition of multiple layers of video or user interface elements. The display device 118 can be an internal or external display device. In one embodiment the display device 118 is a head mounted display device, such as a virtual reality (VR) display device or an augmented reality (AR) display device. Graphics processor 100 may include a video codec engine 106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

Graphics processor 100 may include a block image transfer (BLIT) engine 103 to perform two-dimensional (2D) rasterizer operations including, for example, bit-boundary block transfers. However, alternatively, 2D graphics operations may be performed using one or more components of graphics processing engine (GPE 110). In some embodiments, GPE 110 is a compute engine for performing graphics operations, including three-dimensional (3D) graphics operations and media operations.

GPE 110 may include a 3D pipeline 112 for performing 3D operations, such as rendering three-dimensional images and scenes using processing functions that act upon 3D primitive shapes (e.g., rectangle, triangle, etc.). The 3D pipeline 112 includes programmable and fixed function elements that perform various tasks within the element and/or spawn execution threads to a 3D/Media subsystem 115. While 3D pipeline 112 can be used to perform media operations, an embodiment of GPE 110 also includes a media pipeline 116 that is specifically used to perform media operations, such as video post-processing and image enhancement.

Media pipeline 116 may include fixed function or programmable logic units to perform one or more specialized media operations, such as video decode acceleration, video de-interlacing, and video encode acceleration in place of, or on behalf of video codec engine 106. Media pipeline 116 may additionally include a thread spawning unit to spawn threads for execution on 3D/Media subsystem 115. The spawned threads perform computations for the media operations on one or more graphics execution units included in 3D/Media subsystem 115.

The 3D/Media subsystem 115 may include logic for executing threads spawned by 3D pipeline 112 and media pipeline 116. The pipelines may send thread execution requests to 3D/Media subsystem 115, which includes thread dispatch logic for arbitrating and dispatching the various requests to available thread execution resources. The execution resources include an array of graphics execution units to process the 3D and media threads. The 3D/Media subsystem 115 may include one or more internal caches for thread instructions and data. Additionally, the 3D/Media subsystem 115 may also include shared memory, including registers and addressable memory, to share data between threads and to store output data.

Figure 2A:
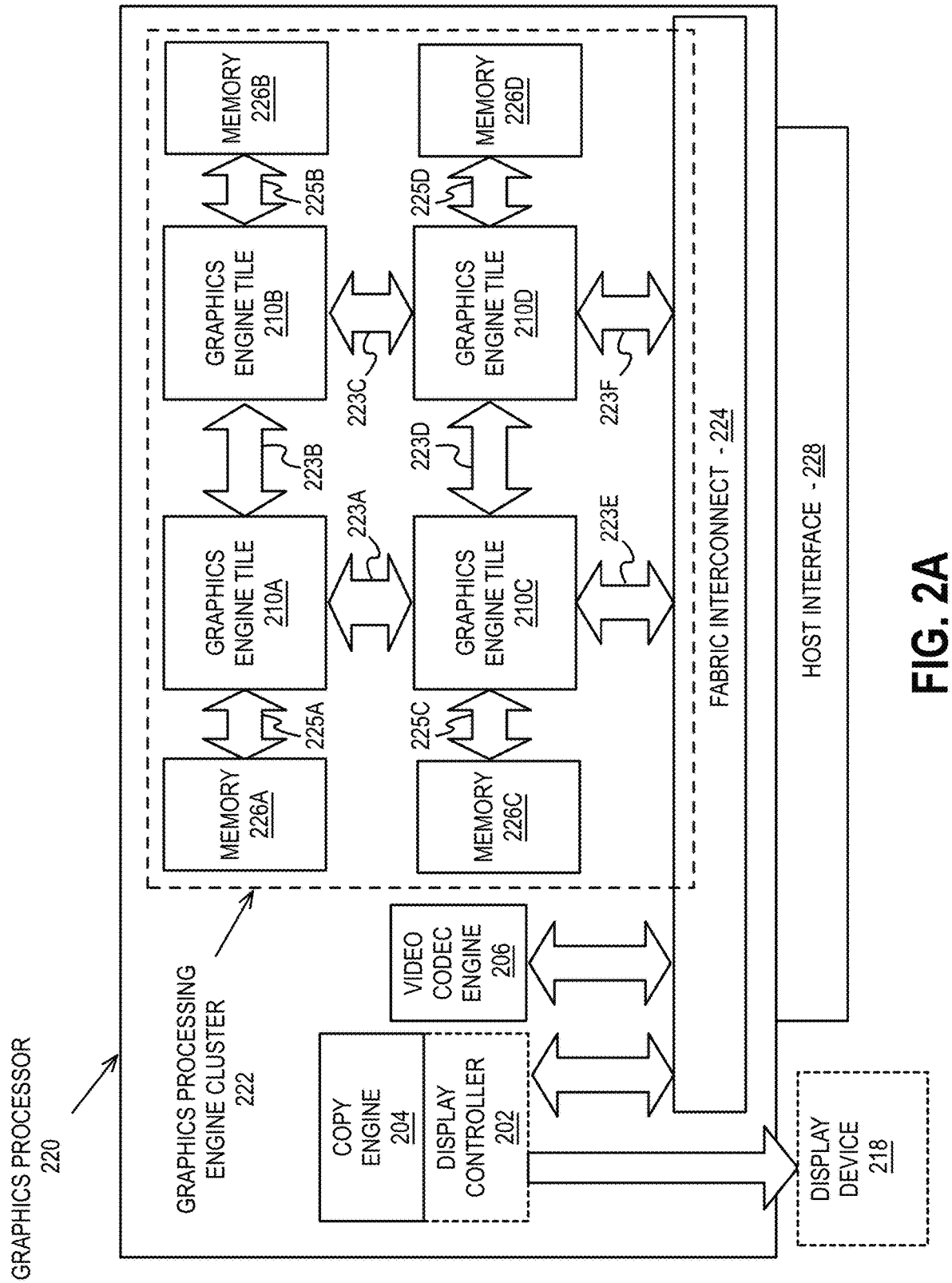
FIG. 2A-2B illustrates a graphics processor and a compute accelerator, according to embodiments.

FIG. 2A illustrates a graphics processor 220, according to an embodiment. The graphics processor 220 can be a variant of the graphics processor 100 and may be used in place of the graphics processor 100 and vice versa. Therefore, the disclosure of any features in combination with the graphics processor 100 herein also discloses a corresponding combination with the graphics processor 220 but is not limited to such. The graphics processor 220 has a tiled architecture, according to embodiments described herein. The graphics processor 220 may include a graphics processing engine cluster 222 having multiple instances of the GPE 110 of FIG. 1 within a graphics engine tile 210A-210D. Each graphics engine tile 210A-210D can be interconnected via a set of tile interconnects 223A-223F. Each graphics engine tile 210A-210D can also be connected to a memory module or memory device 226A-226D via memory interconnects 225A-225D. The memory devices 226A-226D can use any graphics memory technology. For example, the memory devices 226A-226D may be graphics double data rate (GDDR) memory. The memory devices 226A-226D may be HBM modules that can be on-die with their respective graphics engine tile 210A-210D. The memory devices 226A-226D may be stacked memory devices that can be stacked on top of their respective graphics engine tile 210A-210D. Each graphics engine tile 210A-210D and associated memory 226A-226D may reside on separate chiplets, which are bonded to a base die or base substrate, as described in further detail in FIG. 20B-20D.

The graphics processor 220 may be configured with a non-uniform memory access (NUMA) system in which memory devices 226A-226D are coupled with associated graphics engine tiles 210A-210D. A given memory device may be accessed by graphics engine tiles other than the tile to which it is directly connected. However, access latency to the memory devices 226A-226D may be lowest when accessing a local tile. In one embodiment, a cache coherent NUMA (ccNUMA) system is enabled that uses the tile interconnects 223A-223F to enable communication between cache controllers within the graphics engine tiles 210A-210D to keep a consistent memory image when more than one cache stores the same memory location.

The graphics processing engine cluster 222 can connect with an on-chip or on-package fabric interconnect 224. In one embodiment the fabric interconnect 224 includes a network processor, network on a chip (NoC), or another switching processor to enable the fabric interconnect 224 to act as a packet switched fabric interconnect that switches data packets between components of the graphics processor 220. The fabric interconnect 224 can enable communication between graphics engine tiles 210A-210D and components such as the video codec engine 206 and one or more copy engines 204. The copy engines 204 can be used to move data out of, into, and between the memory devices 226A-226D and memory that is external to the graphics processor 220 (e.g., system memory). The fabric interconnect 224 can also be used to interconnect the graphics engine tiles 210A-210D. The graphics processor 220 may optionally include a display controller 202 to enable a connection with an external display device 218. The graphics processor may also be configured as a graphics or compute accelerator. In the accelerator configuration, the display controller 202 and display device 218 may be omitted.

The graphics processor 220 can connect to a host system via a host interface 228. The host interface 228 can enable communication between the graphics processor 220, system memory, and/or other system components. The host interface 228 can be, for example, a PCI express bus or another type of host system interface. For example, the host interface 228 may be an NVLink or NVSwitch interface. The host interface 228 and fabric interconnect 224 can cooperate to enable multiple instances of the graphics processor 220 to act as single logical device. Cooperation between the host interface 228 and fabric interconnect 224 can also enable the individual graphics engine tiles 210A-210D to be presented to the host system as distinct logical graphics devices.

Figure 2B:
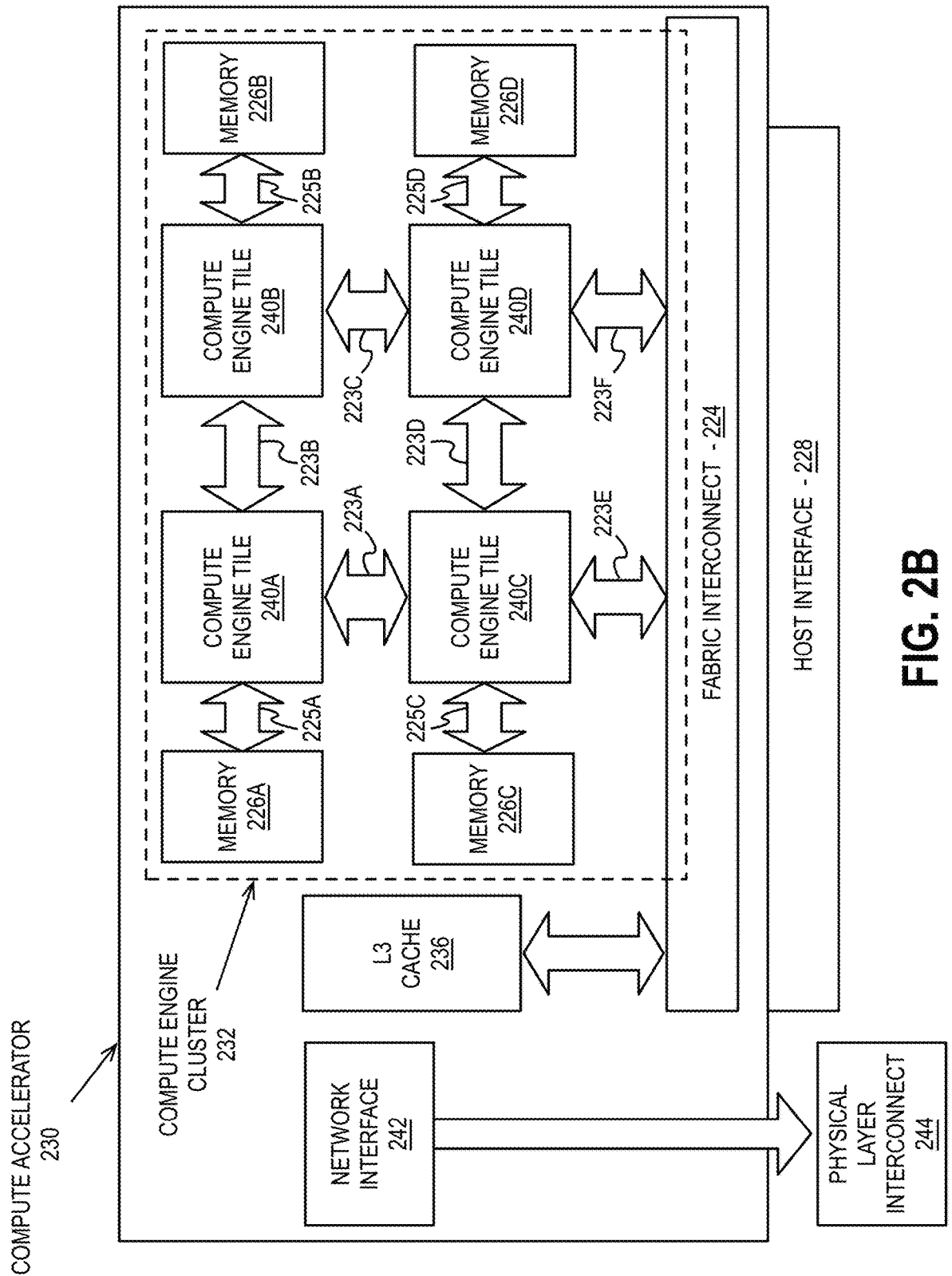

FIG. 2B illustrates a compute accelerator 230, according to embodiments described herein. The compute accelerator 230 can include architectural similarities with the graphics processor 220 of FIG. 2B and is optimized for compute acceleration. A compute engine cluster 232 can include a set of compute engine tiles 240A-240D that include execution logic that is optimized for parallel or vector-based general-purpose compute operations. The compute engine tiles 240A-240D may not include fixed function graphics processing logic, although in some embodiments one or more of the compute engine tiles 240A-240D can include logic to perform media acceleration. The compute engine tiles 240A-240D can connect to memory 226A-226D via memory interconnects 225A-225D. The memory 226A-226D and memory interconnects 225A-225D may be similar technology as in graphics processor 220 or can be different. The graphics compute engine tiles 240A-240D can also be interconnected via a set of tile interconnects 223A-223F and may be connected with and/or interconnected by a fabric interconnect 224. In one embodiment the compute accelerator 230 includes a large L3 cache 236 that can be configured as a device-wide cache. The compute accelerator 230 can also connect to a host processor and memory via a host interface 228 in a similar manner as the graphics processor 220 of FIG. 2B.

The compute accelerator 230 can also include an integrated network interface 242. In one embodiment the integrated network interface 242 includes a network processor and controller logic that enables the compute engine cluster 232 to communicate over a physical layer interconnect 244 without requiring data to traverse memory of a host system. In one embodiment, one of the compute engine tiles 240A-240D is replaced by network processor logic and data to be transmitted or received via the physical layer interconnect 244 may be transmitted directly to or from memory 226A-226D. Multiple instances of the compute accelerator 230 may be joined via the physical layer interconnect 244 into a single logical device. Alternatively, the various compute engine tiles 240A-240D may be presented as distinct network accessible compute accelerator devices.

Graphics SoC Architecture

Figure 3:
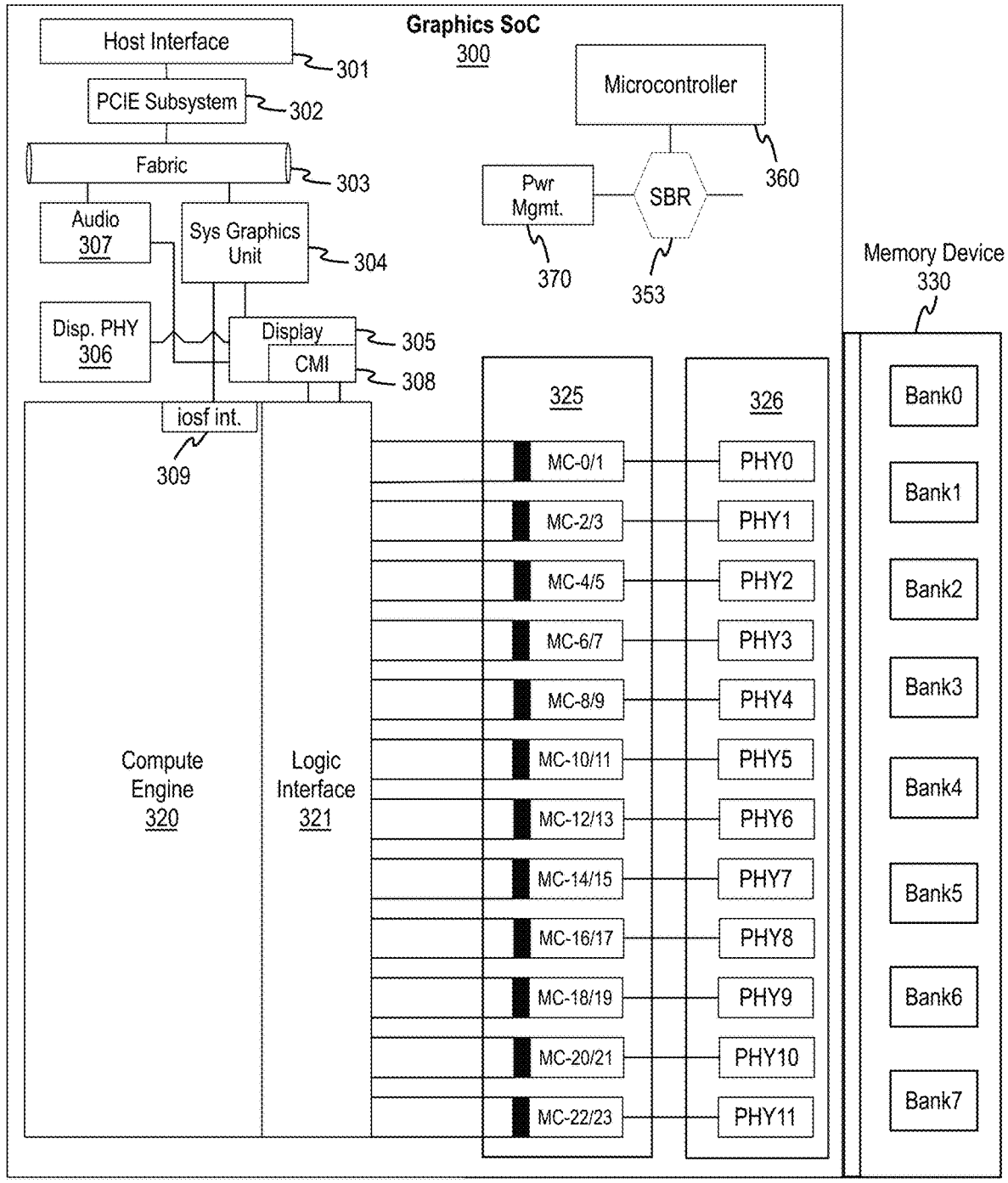
FIG. 3 illustrates a block diagram of a graphics SoC.

FIG. 3 illustrates a block diagram of a graphics SoC 300, according to an embodiment. A converged architecture view is shown that includes components of the graphics SoC 300 that are architected with specific modular connection points within the architecture, such that components can be added or removed from a monolithic design or divided among multiple chiplets in a disaggregated design. For example, PCIe connectivity may be on a separate die, with the PCIe physical interface (host interface 301) and other components of the PCIE subsystem 302 (e.g., upstream port, and fabric bridge) on a first die and the switch fabric 303 and remaining SoC components on a second die. Some of the SoC components on the second die may also be located on a third die. For example, graphics core clusters (e.g., compute engine 320) and the memory subsystem (e.g., memory controllers 325, physical interfaces 326, memory device 330) may reside on the third die. A logic interface 321 can provide connectivity between the compute engine 320 and the memory subsystem. The SoC 300 also includes a compute engine 320, which includes multiple graphics core clusters, each including multiple graphics cores. The compute engine 320 couples with the fabric via an on-chip system fabric (IOSF) interconnect 309. In one embodiment, the compute engine 320 resides on a fourth die. In such embodiment, the IOSF interconnect 309 can couple with a multi-die fabric interconnect (MDFI) to the second die and the logic interface 321 can couple with an MDFI to the third die.

Component communication within the graphics SoC 300 can be performed using a sideband network, which is a standardized mechanism for communicating out-of-band information between components of the graphics SoC 300. Components of the sideband network can interconnect via sideband routers (SBR 353). The graphics SoC 300 can also include a microcontroller 360 to perform advanced scheduling and system management functions. In one embodiment, the microcontroller 360 can also operate with power management circuitry 370 to manage component power levels and can participate in dynamic voltage and frequency scaling.

A system graphics unit 304 couples with the PCIe subsystem via the fabric and provides PCIe endpoint functionality to the graphics SoC 300. A display controller 305 couples with a display physical interface 306 to provide, for example, DisplayPort connectivity, as well as, in some embodiments, HDMI output, which can each also provide for output from audio circuitry 307. A USB4/Thunderbolt connector can also provide display connectivity. A converged memory interface (CMI 308) is also present, which allows access to the memory system via the host interface.

Where the graphics cores and memory interfaces reside on the third die, different types of graphics cores having differing architectures may be used for different products. For example, a graphics core including a systolic array can be used for some server products, while the systolic array and be excluded or modified for another product that targets a different server segment. The memory bridge and memory devices/controllers may reside on a fourth die, with different memory technologies used for different product segments. For example, a server product can be coupled with a stack of HBM memory, while a client product can be coupled with GDDR6X memory.

The memory subsystem interfaces the memory device and its associated memory banks with the compute engine via a logic interface. The memory subsystem includes an array of memory controllers (MC) 325, physical memory interfaces (PHY) 326, and the memory device 330, each of which consume power and reduce the amount of device power that can be allocated to the compute engine 320. The memory device is configured to operate at a specific voltage and frequency. The voltage and frequency of the memory subsystem is related to the performance and power consumption of the memory subsystem. For statically configured memory subsystems, voltage and frequency is configured based on a balance between power consumption and performance. A minimum voltage is required to operate the memory controllers, PHYs, and memory device. Memory subsystem components are generally operated at the lowest possible voltage that will reliably support the frequency at which the memory device is configured. Higher frequencies enable higher memory device performance at the cost of higher power consumption. While dynamic voltage and frequency scaling has been applied to the compute engine 320, discrete graphics cards have not generally made extensive use of dynamic voltage and frequency scaling in the memory subsystem. Particularly, workload specific memory subsystem voltage and frequency scaling has not been observed in discrete graphics cards.

Embodiments described herein provide an SoC for a discrete graphics card that includes a memory subsystem configurable for dynamic voltage and frequency scaling (DVFS) based on the workload executed by the device. When executing memory intensive workloads that are limited by the performance of the memory subsystem, the voltage and frequency of the memory system can be scaled to provide higher memory performance. When idle or when executing workloads that are more limited by compute performance than memory performance, the voltage and frequency of the memory subsystem can be reduced, allowing the voltage and frequency of the compute engine to scale without exceeding the overall device power limit.

In one embodiment, a set of work points is identified for each graphics product SKU based on the power envelope associated with that SKU. In discrete graphics systems, the memory devices (GDDR, HBM, etc.) can operate only at a limited set of voltages. During memory training, various operable voltage and frequency points are trained. Memory training can be performed at device initialization by device boot firmware in conjunction with the memory controllers 325 and physical interfaces 326. The training operation configures delay and timing registers for clock alignment and optimization. The training includes sending various patterns to the memory and exercising the memory channels by varying time delays and voltages for both reads and writes. The training also includes finding the optimal settings in both time/voltage domains for each of the read and write parameters. The trained parameters are then stored on a flash device for later retrieval. Post-silicon calibration can be used to determine appropriate voltage and frequency points. The memory system is then configured to enable transitions between those voltage and frequency points. The hardware is configured to quickly switch frequencies without significantly impacting the existing workloads either in-terms of user experience or workload performance. When necessary, higher voltages can be used to enable the highest set of memory frequencies at the cost of a small voltage switching delay.

The voltage and frequency settings that are available for a device SKU can vary based on the type of memory (e.g., GDDR6, GDDR6X, GDDR7, HBM2, HBM3, etc.) selected for the device and the associated specifications for those memory. In one embodiment, the specific voltage and frequency settings can be further determined on a per-device basis based on post-silicon characterization and training that is performed for each device. This device-specific characterization and training can further expand or limit the available voltages and frequencies.

Voltage and frequencies can be selected from the available set points based on device power state. The SoC device will transition to different power states based on, for example, whether the display controller 305 is the only active agent, during media playback without associated compute engine 320 activity, on mobile devices when in battery mode, and when in a standby state, in which voltage is reduced to near zero.

Voltage and frequencies can also be selected based on the workload being executed on the device. Workload-based scaling can be performed during the transition from idle to busy. In one embodiment, when batches of workload are about to be released to the graphics SoC, the memory subsystem can be set at, e.g., max-frequency/4 or max-frequency/8, and then moved to a higher frequency when the workload starts. In one embodiment, workload execution is performed with the memory subsystem at maximum frequency. In one embodiment, the workload frequency can be scaled based on workload demand and the power envelope of the device, with different scaling patterns being used based on the workload being executed. For example, memory frequency and voltage can scale differently depending on whether matrix accelerators within the compute engine 320 are to be used to process a workload. When workloads are to be executed using the matrix accelerators, when possible, the graphics SoC will opportunistically transition the memory to a pre-calibrated high-performance frequency that is determined based on post-silicon characterization of dynamic capacitance (Cdyn) and max current (ICC-max), allowing the memory subsystem to operate at the maximum possible performance level for that specific device. This high-performance mode, in some embodiments, may also be made available in other specifically identified workload conditions, subject to limits imposed by the dynamically determined power and thermal state of the device.

Voltage Switching in a Graphics SoC Memory Subsystem

Figure 4:
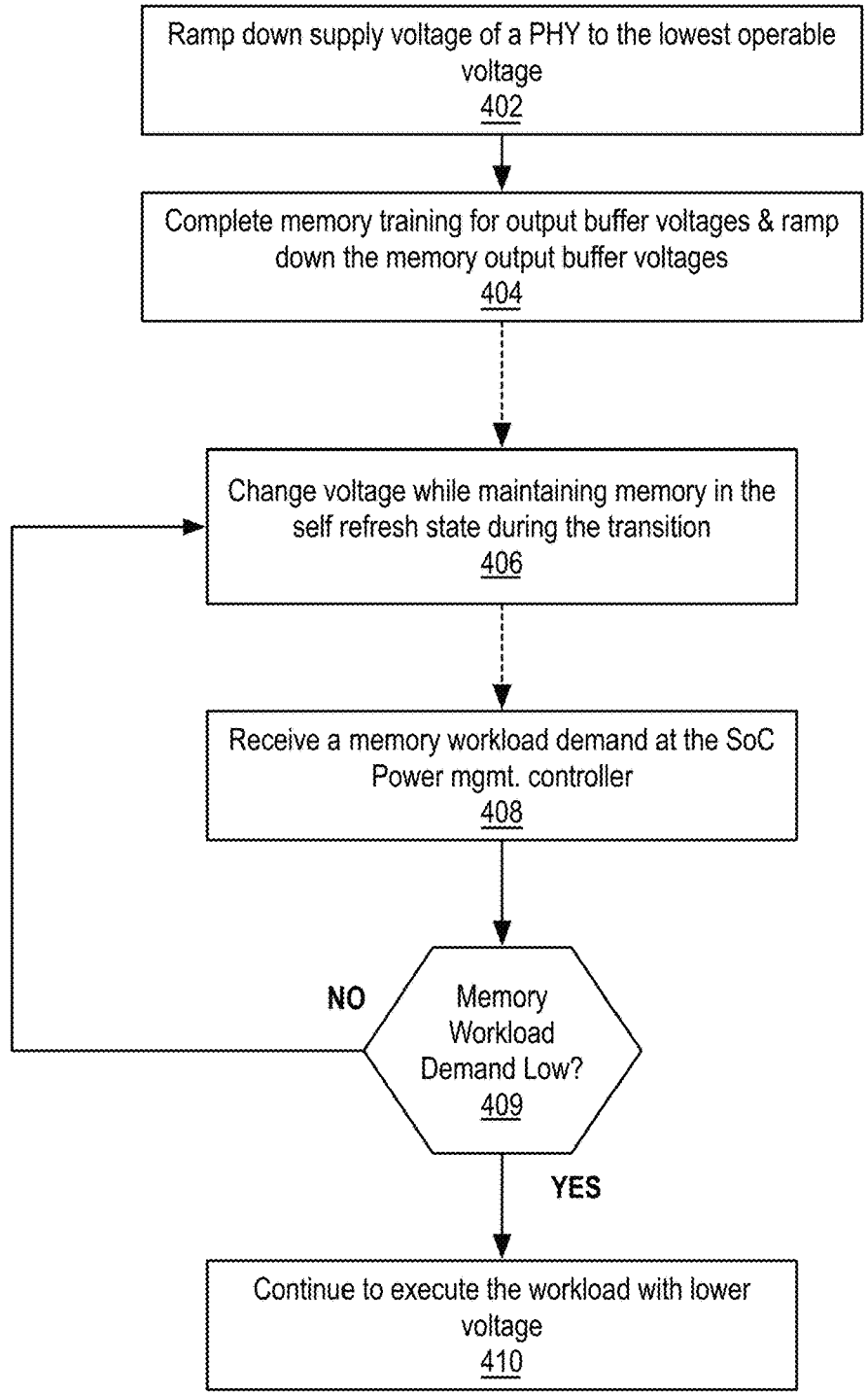
FIG. 4 is a flow chart of a method to transition between voltages of a memory subsystem of a graphics SoC, according to an embodiment.

FIG. 4 illustrates a method 400 to transition between voltages in a graphics SoC, according to an embodiment. In one embodiment, the method 400 is performed by memory controllers and power ICs of the memory subsystem of the graphics SoC. The method includes, for each memory controller, to ramp the supply voltage (e.g., VDDA/VDDR) of the PHY associated with the memory controller to the lowest operable voltage (402), complete memory training for memory output buffer voltages (VDDQ) and ramp down the memory output buffer voltage (404). Memory training can be performed by boot firmware, such as on-device memory reference code (MRC) firmware that is used to initialize memory controllers and optimize read/write timing and voltage for optimal performance.

During operation, the memory subsystem is configured to change voltage while maintaining the memory in the self-refresh state during the transition (406). Maintaining the memory in the self-refresh state allow the memory voltage to be changed without losing data within the memory. The memory subsystem can receive a memory workload demand at the SoC Power management controller (408). This memory workload demand can be received from the graphics driver and/or via scheduling logic of a graphics microcontroller (e.g., microcontroller 360 of FIG. 3). In one embodiment, an expected memory workload demand can be received as a hint from the graphics driver and the microcontroller can provide a more specific memory workload demand before scheduling the workloads to the compute engine.

The next operations of the method 400 are determined based on memory workload demand (409). The memory workload demand is used to compute the point at which the graphics memory will operate. A workload may be computationally intensive, memory intensive, or both computationally and memory intensive. A memory intensive workload will have correspondingly high memory workload demand, while a computationally intensive workload that is not also memory intensive may have a lower memory workload demand. In one embodiment, the memory workload demand is cumulative and includes other workloads being executed by the graphics SoC, in addition to upcoming workloads. In one embodiment, the power management circuitry accounts for existing workloads and adjusts that accounting based on the upcoming workload demand. The memory subsystem will attempt to balance power consumption between the memory subsystem and the compute engine to achieve the highest overall system performance. Specifically, for workloads that are more computationally intensive than memory intensive may benefit if the memory subsystem operates at a lower voltage, which leaves additional boost headroom to increase the voltage and/or frequency of the compute engine 320. While the workload demand remains low, the graphics SoC can continue processing the workload at the lower voltage (410). However, when memory workload demand rises, the memory subsystem voltage can be increased to support higher potential voltages (406).

Figure 5A:
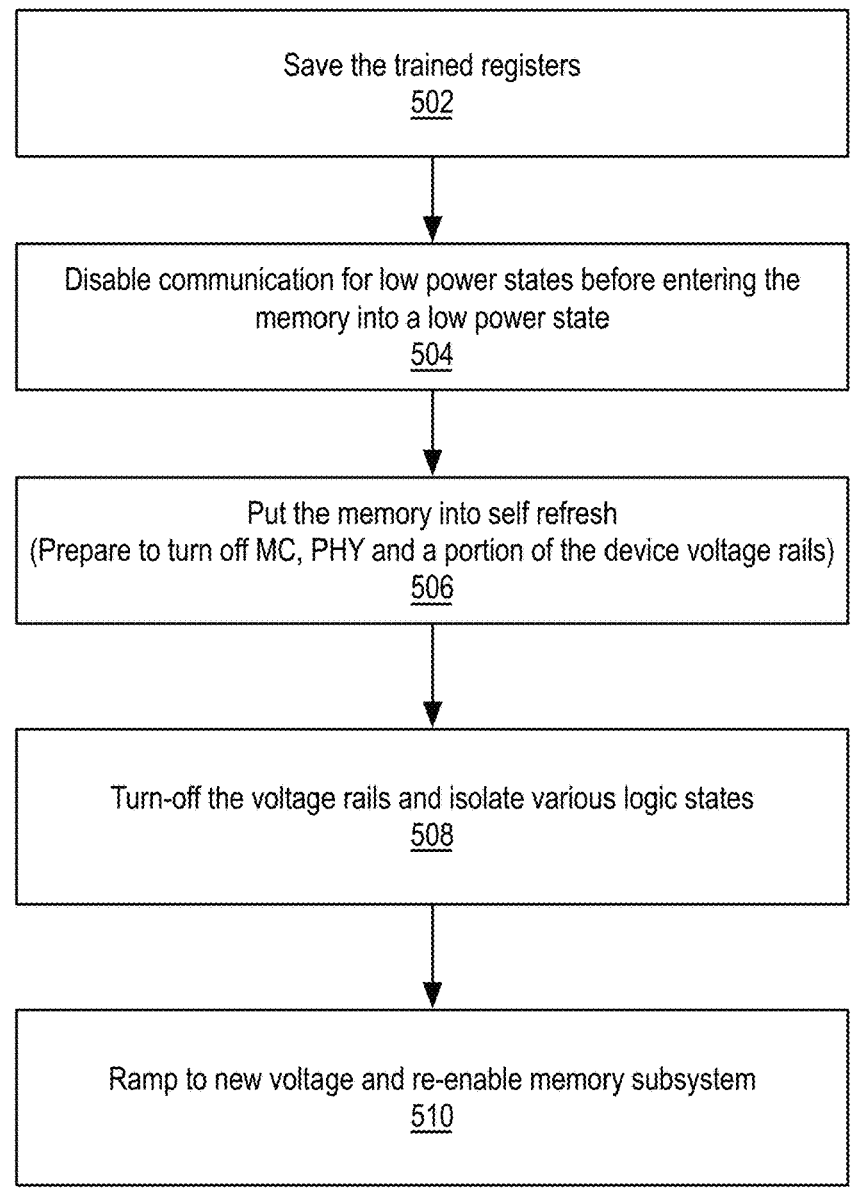
FIG. 5A-5B illustrate operations to change memory subsystem voltage in a graphics SoC.
Figure 5B:
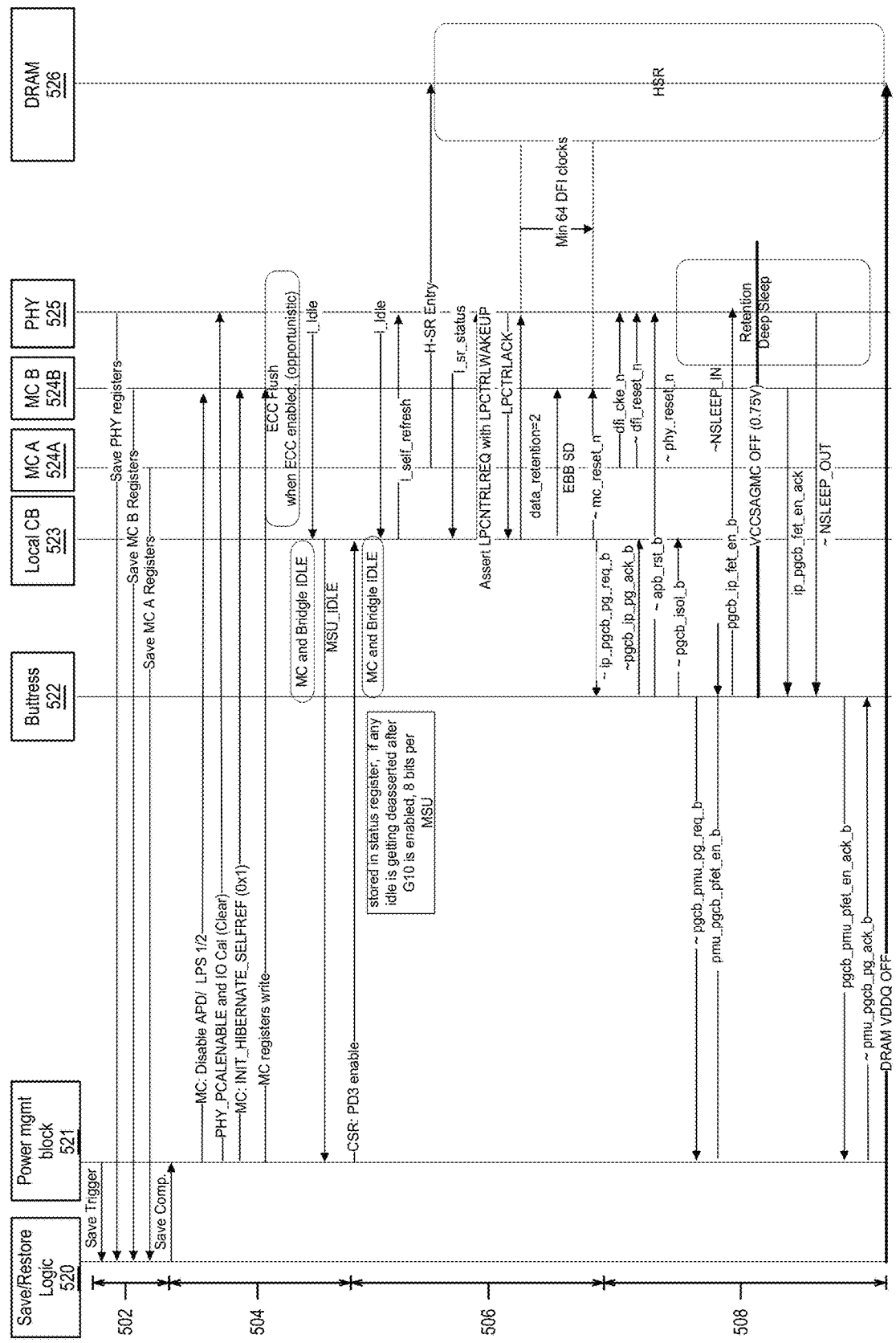

FIG. 5A-5B illustrate operations to change memory subsystem voltage in a graphics SoC. FIG. 5A illustrates a method 500 to dynamically adjust memory subsystem voltage. FIG. 5B is a sequence diagram of sub-operations performed by electronic components of the graphics SoC to adjust the memory subsystem voltage. Relevant electronic components to perform method 500 of FIG. 5A are shown in FIG. 5B, and include register save/restore logic 520, a power management block 521, a buttress 522, local control block 523, a first memory controller 524A (MC A), a second memory controller 524B (MC B), one or more physical interfaces (PHY 525), and the DRAM 526. Multiple sets of the components of FIG. 5B can be included within the memory subsystem (e.g., memory controllers 325, physical interfaces 326, memory device 330), as shown in FIG. 3.

For operations 502-508 of method 500 shown in FIG. 5A, multiple sub-operations are shown in FIG. 5B. Method 500 includes to save the training registers that store parameters determined during memory training, as shown in block 502. Registers for the PHY 525, first memory controller 524A, and second memory controller 524B are saved. The registers are saved to prevent content loss during voltage switching, as the voltage rails will be shut off during the voltage transition. The method 500 additionally includes to disable communication for low power states before entering into a low power state, as shown at block 504. The graphics SoC will then cease communication with the memory subsystem. The graphics SoC will wait for traffic towards the memory controllers to be quiesced and prepare the memory to be placed into a self-refresh state. Method 500 additionally includes to place the memory into self-refresh and prepare to turn off the MCs, PHY, and a portion of the device voltage rails, as shown in block 506. The lowest possible self-refresh state that is available for the memory device is used, such as but not limited to hibernate self-refresh for GDDR6 and later. A portion of the voltage rails remained powered to enable the device to perform self-refresh. While the device is in self-refresh, the memory controllers 524A-524B and PHY 525 can be disabled without loss of data. The method 500 additionally includes to turn off the voltage rails and isolate various logic states, as shown at block 508. The memory subsystem can then ramp to a new voltage and re-enable the memory subsystem, as shown at block 510. Re-enabling the memory subsystem is performed by reversing the operations described above. All voltage rails can be re-enabled at the new voltage, the memory controllers 524A-524B and PHY 525 can be re-enabled, communication with the memory can be re-enabled, and the memory subsystem can exit the low power state at the new operational voltage.

Frequency Switching in a Graphics SoC Memory Subsystem

Figure 6:
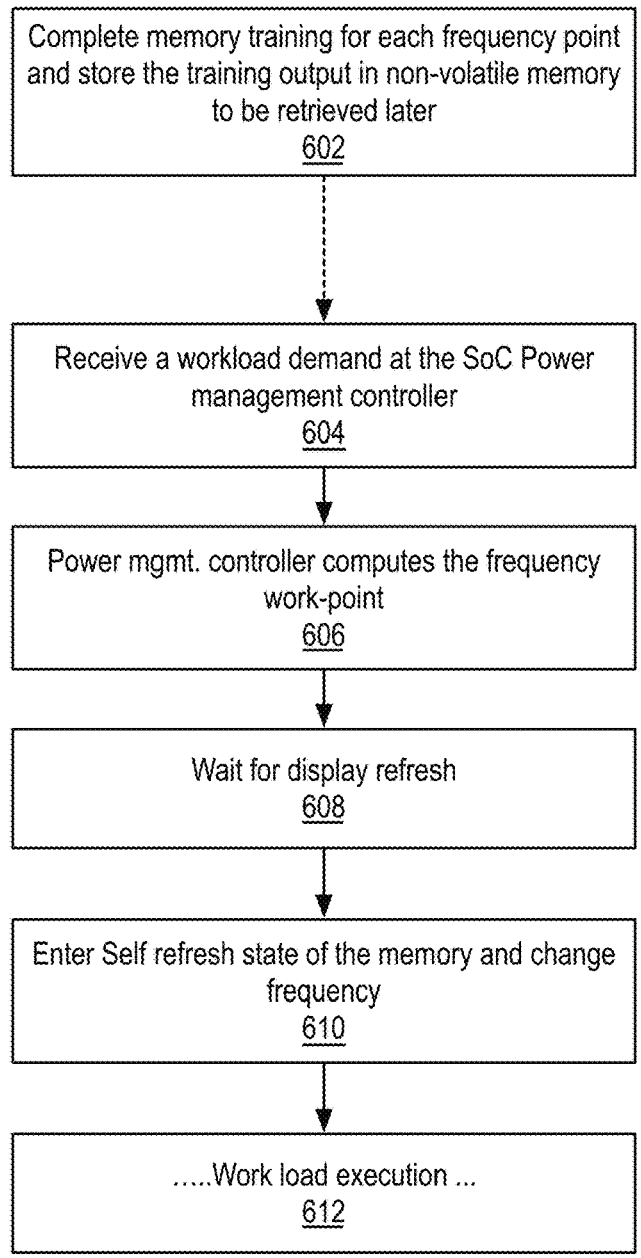
FIG. 6 is a flow chart of a method to transition between frequencies of a memory subsystem of a graphics SoC, according to an embodiment.

FIG. 6 is a flow chart of a method 600 to transition between frequencies of a memory subsystem of a graphics SoC, according to an embodiment. In one embodiment, the method 600 is performed by memory controllers and power ICs of the memory subsystem of the graphics SoC. Method 600 includes to complete memory training for each frequency point and store the training output in non-volatile memory to be retrieved later (602).

The method 600 includes, during operation of the graphics SoC, to receive a workload demand at the SoC power management controller (604). The workload demand can be received from the graphics driver or from scheduler logic of a graphics microcontroller (e.g., microcontroller 360 of FIG. 3). The power management controller can then compute the frequency work-point based on the workload demand (606). In one embodiment, the frequency work-point is selected based on the type of workload to be performed. For example, when matrix engines are to be used for a workload, a specific high-performance frequency mode can be enabled based on device-specific post-silicon metrics. The high-performance frequency mode can enable the use of a pre-determined maximum stable frequency for that specific device. Alternatively, a lower memory frequency can be set for workloads that are not memory intensive. The frequency of the memory system can be performed during display refresh, such that the short period of time in which the memory is inaccessible is not visible to the user. The graphics SoC can wait for display refresh (608) and, during display refresh, place the memory into self-refresh and change the memory frequency (610). Workload execution can then continue at the updated frequency (612).

Figure 7A:
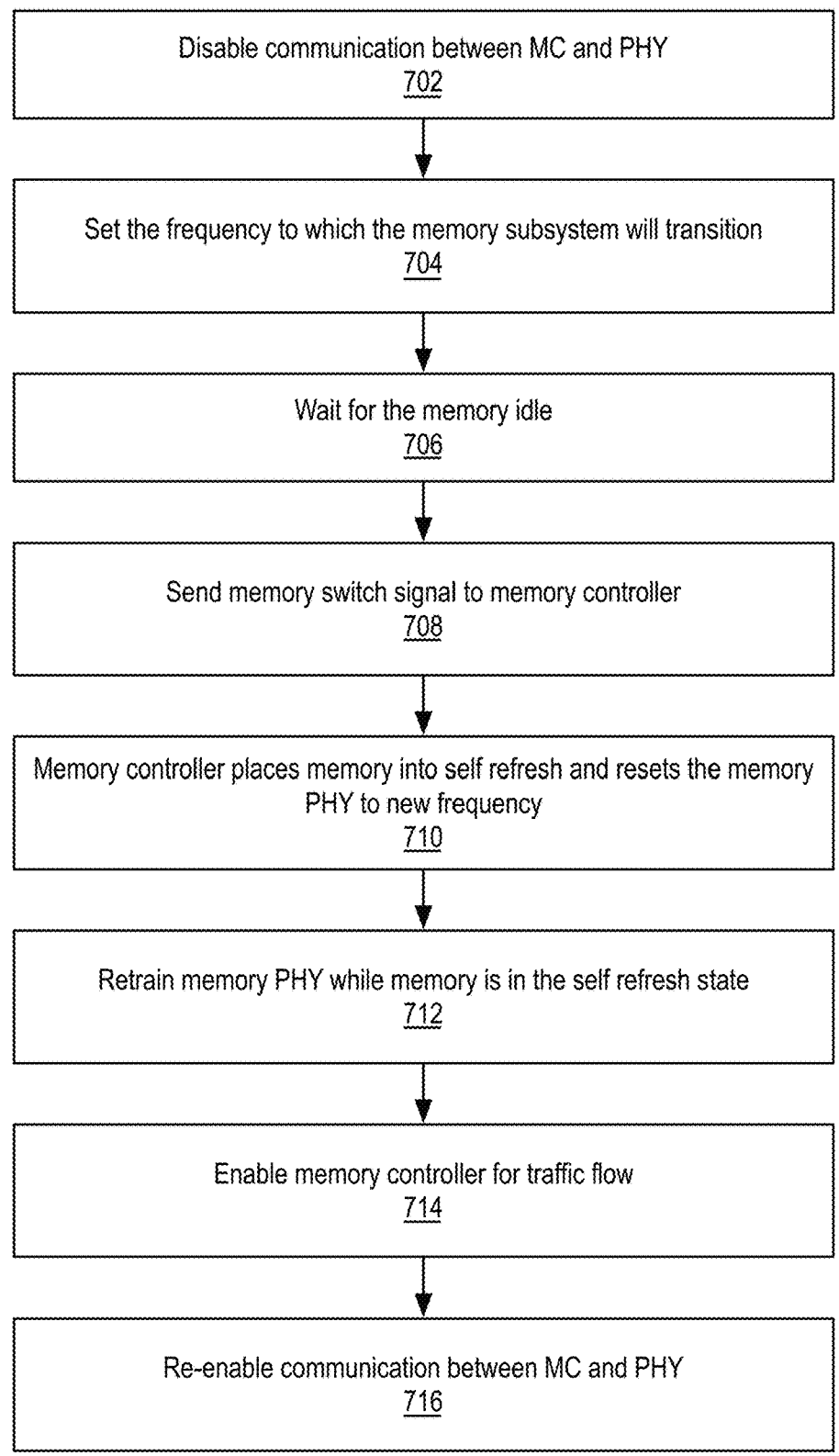
FIG. 7A-7B illustrate operations to change memory subsystem frequency in a graphics SoC.
Figure 7B:
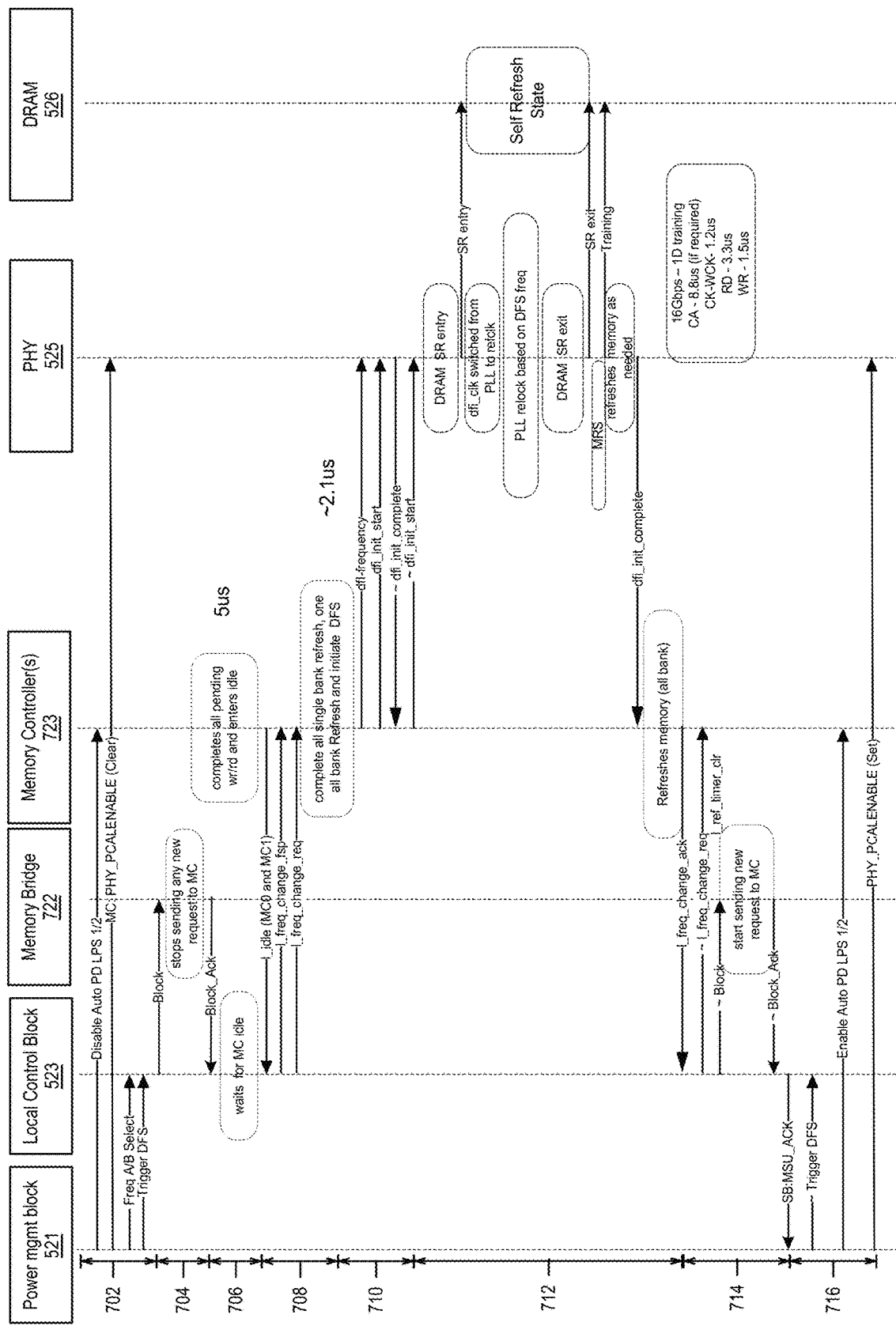

FIG. 7A-7B illustrate operations to change memory subsystem frequency in a graphics SoC. FIG. 7A illustrates a method 700 to change the memory subsystem frequency. FIG. 7B is a sequence diagram of operations performed by electronic components of the graphics SoC to change the memory subsystem frequency. Relevant components include the power management block 571 and local control block 523, a memory bridge 722, memory controller(s) 723 (e.g., memory controllers 524A-524B), the one or more physical memory interfaces (PHY 525), and the DRAM 526. In one embodiment, the power management block acts as a dynamic frequency scaling (DFS) initiator and the memory bridge 722 acts a front end for the memory controller(s) 723. Multiple sets of these components can be included within the memory subsystem (e.g., memory controllers 325, physical interfaces 326, memory device 330) shown in FIG. 3 to manage voltage and frequency for DRAM 526. The operations can be performed at each set of components.

For operations 702-716 of method 700 shown in FIG. 7A, multiple sub-operations are shown in FIG. 7B. In one embodiment, method 700 includes for the graphics SoC (via the power management block 521 acting as DFS initiator) to disable communication between the memory controller(s) 723 and PHY 525, as shown in block 702. Disabling communication includes disabling the low power states of the memory subsystem. The graphics SoC will then set the frequency to which the memory subsystem will transition and disable traffic to the memory controller, as shown in block 704. The frequency transition will not occur until after the memory traffic becomes idle and the PHY 525 can be safely reset. The graphics SoC will wait for the memory to become idle, as shown at block 706, then send a memory switch signal to the memory controller(s) 723, as shown in block 708. The memory controller(s) 723 will then place the memory into self-refresh and reset the memory PHY to the new frequency, as shown in block 710. While the memory is in self-refresh, the memory controller(s) 723 can retrain the memory PHY 525, as shown at block 712. In one embodiment, the memory controller(s) 723 can retrain the memory PHY 525 by loading previously stored parameters that were generated during boot-time memory training for the various supported frequencies. Once the memory PHY 525 is retrained, the memory controller(s) 723 are enabled for traffic flow, as shown at block 714. The graphics SoC can then re-enable communication between the memory controller(s) 723 and PHY 525, as shown at block 716, which can include re-enabling the low power states of the memory subsystem. The memory is now operable at the updated frequency.

Table 1 below shows a sample set of voltage and frequency pairings that can be configured for a graphics memory subsystem. The sample voltage and frequency pairings are exemplary of one embodiment. Other embodiments can make use of other voltage and frequency pairings. The concepts described herein are not tied to any specific voltage or frequency.

TABLE 1

Exemplary Voltage and Frequency for
a Graphics SoC Memory Subsystem

| Voltage | Frequency | Comments |
| --- | --- | --- |
| 1.25 V | 4 GT/sec | Initial frequency after SoC Boot |
| 1.25 V | 8 GT/sec | (v, f) points determined by: |
| 1.25 V | 12 GT/sec | 1) Workload demands |
| 1.35 V | 16 GTSec | 2) Power envelope |
| 1.35 V | 18 GT/sec | |
| 1.35 V | 20-24 GT/Sec | |

In one embodiment, changing frequencies within the same voltage set point can be performed more rapidly than changing to a frequency that requires a higher voltage. Accordingly, in the memory subsystem can freely adjust frequencies at a specific voltage set point based on memory demands, but may delay an increase to a frequency that requires a higher voltage until that shift can be performed in a manner that is transparent to the user. Additionally, as voltages that are available to the memory subsystem may vary according to the current power envelope of the SoC, the memory subsystem, in response to an increase in memory workload demand, may select a frequency that may be less than the maximum possible frequency if the voltage associated with the maximum possible frequency is not currently available.

According to the above disclosure, embodiments described herein provide a discrete graphics system on a chip integrated circuit (SoC) that includes circuitry to dynamically adjust the voltage and frequency of a memory subsystem of the graphics SoC based on a workload executed by the graphics processing resources and a power state of the graphics SoC. One embodiment provides a system on a chip integrated circuit (SoC) comprising graphics processing resources including one or more graphics processing cores and a memory subsystem including a memory controller, a physical interface, and a memory device. The SoC additionally includes circuitry configured to dynamically adjust a voltage and frequency of the memory subsystem based on a workload executed by the graphics processing resources. Multiple operational frequencies can be used for workload execution, rather than using a single operational voltage and frequency. The circuitry can be additionally configured to dynamically adjust the voltage or frequency of the memory subsystem based on a power state of the SoC.

In one embodiment, the circuitry is configured to select, based on a parameter associated with the workload to be executed by the graphics processing resources, a voltage from a plurality of operational voltages enabled for the memory subsystem and select a frequency from a plurality of operational frequencies enabled for the memory subsystem. The circuitry can train parameters of the memory subsystem for multiple combinations of the plurality of operational voltages and the plurality of operational frequencies and then store trained parameters of the memory subsystem to a non-volatile memory of the SoC. In response to a workload demand for a workload to be executed by the graphics processing system, the circuitry can select a frequency from the plurality of operational frequencies based on the workload demand and adjust the frequency of the memory subsystem to the selected frequency. The frequency can be adjusted during a display refresh, such that, for example, the circuitry can detect a beginning of a display refresh period and adjust the frequency of the memory subsystem to the selected frequency within the display refresh period. To adjust the frequency of the memory subsystem to the selected frequency, the circuitry is configured to disable traffic to the memory controller, disable communication between the memory controller and the physical interface, wait for completion of pending read and write requests to complete, signal the memory controller to change to the selected frequency, re-enable traffic to the memory controller, and re-enable communication between the memory controller and the physical interface. To change to the selected frequency, the memory controller is configured to place memory coupled with the memory subsystem into a self-refresh mode, set the physical interface to the selected frequency, and retrain the physical interface while the memory coupled with the memory subsystem is in the self-refresh mode. To retrain the physical interface, the memory controller is configured to program the physical interface according to trained parameters associated with the selected frequency.

In one embodiment, the circuitry configured to select a frequency from the plurality of operational frequencies based on a received workload demand, determine a voltage associated with the selected frequency, and adjust the voltage of the memory subsystem to the voltage associated with the selected frequency. The circuitry is additionally configured to dynamically adjust the voltage or frequency of the memory subsystem based on a power state of the SoC. The circuitry can receive a request to adjust a power state of the SoC, determine a voltage associated with power state, determine a frequency associated with the determined voltage, and adjust the voltage and frequency of the memory subsystem to the determined voltage and frequency.

Various methods and graphics processing systems may also be implemented based on the concepts described above.

CPU and GPU System Architecture

Figure 8:
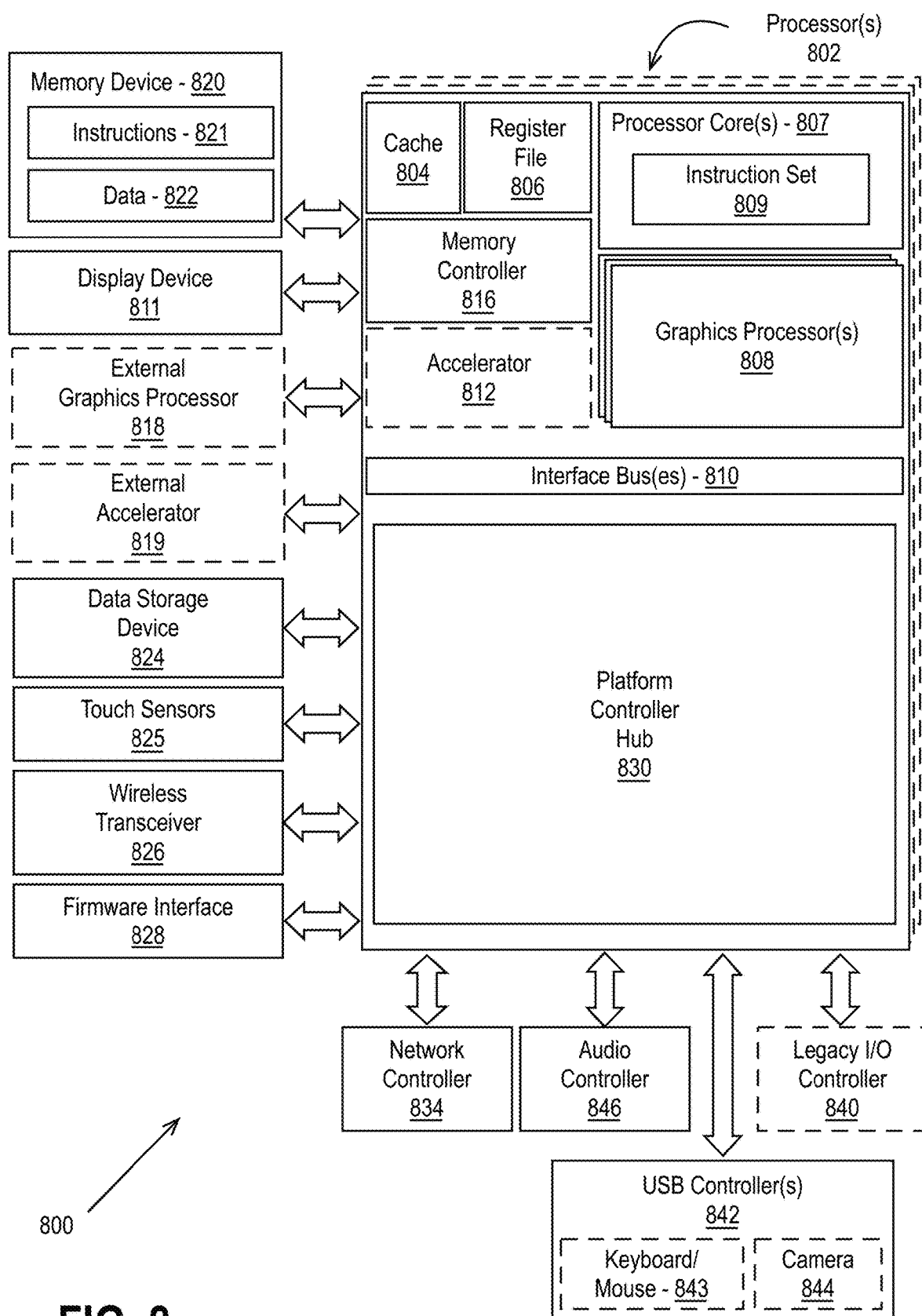
FIG. 8 is a block diagram of a processing system, according to an embodiment.

FIG. 8 is a block diagram of a processing system 800, according to an embodiment. Processing system 800 may be used in a single processor desktop system, a multiprocessor workstation system, or a server system having a large number of processors 802 or processor cores 807. In one embodiment, the processing system 800 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 800 can include, couple with, or be integrated within: a server-based gaming platform; a game console, including a game and media console; a mobile gaming console, a handheld game console, or an online game console. In some embodiments the processing system 800 is part of a mobile phone, smart phone, tablet computing device or mobile Internet-connected device such as a laptop with low internal storage capacity. Processing system 800 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 800 includes or is part of a television or set top box device. In one embodiment, processing system 800 can include, couple with, or be integrated within a self-driving vehicle such as a bus, tractor trailer, car, motor or electric power cycle, plane or glider (or any combination thereof). The self-driving vehicle may use processing system 800 to process the environment sensed around the vehicle.

In some embodiments, the one or more processors 802 each include one or more processor cores 807 to process instructions which, when executed, perform operations for system or user software. In some embodiments, at least one of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). One or more processor cores 807 may process a different instruction set 809, which may include instructions to facilitate the emulation of other instruction sets. Processor core 807 may also include other processing devices, such as a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 can be additionally included in processor 802 and may include different types of registers for storing different types of data (e.g., integer registers, floating-point registers, status registers, and an instruction pointer register). Some registers may be general-purpose registers, while other registers may be specific to the design of the processor 802.

In some embodiments, one or more processor(s) 802 are coupled with one or more interface bus(es) 810 to transmit communication signals such as address, data, or control signals between processor 802 and other components in the processing system 800. The interface bus 810, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 802 include an integrated memory controller 816 and a platform controller hub 830. The memory controller 816 facilitates communication between a memory device and other components of the processing system 800, while the platform controller hub (PCH) 830 provides connections to I/O devices via a local I/O bus.

The memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the processing system 800, to store data 822 and instructions 821 for use when the one or more processors 802 executes an application or process. Memory controller 816 also couples with an optional external graphics processor 818, which may communicate with the one or more graphics processors 808 in processors 802 to perform graphics and media operations. In some embodiments, graphics, media, and or compute operations may be assisted by an accelerator 812 which is a coprocessor that can be configured to perform a specialized set of graphics, media, or compute operations. For example, in one embodiment the accelerator 812 is a matrix multiplication accelerator used to optimize machine learning or compute operations. In one embodiment the accelerator 812 is a ray-tracing accelerator that can be used to perform ray-tracing operations in concert with the graphics processor 808. In one embodiment, an external accelerator 819 may be used in place of or in concert with the accelerator 812.

In some embodiments a display device 811 can connect to the processor(s) 802. The display device 811 can be one or more of an internal display device, as in a mobile electronic device or a laptop device or an external display device attached via a display interface (e.g., DisplayPort, etc.). In one embodiment the display device 811 can be a head mounted display (HMD) such as a stereoscopic display device for use in virtual reality (VR) applications or augmented reality (AR) applications.

In some embodiments the platform controller hub 830 enables peripherals to connect to memory device 820 and processor 802 via a high-speed I/O bus. The I/O peripherals include, but are not limited to, an audio controller 846, a network controller 834, a firmware interface 828, a wireless transceiver 826, touch sensors 825, a data storage device 824 (e.g., non-volatile memory, volatile memory, hard disk drive, flash memory, NAND, 3D NAND, 3D XPoint, etc.). The data storage device 824 can connect via a storage interface (e.g., SATA) or via a peripheral bus, such as a Peripheral Component Interconnect bus (e.g., PCI, PCI express). The touch sensors 825 can include touch screen sensors, pressure sensors, or fingerprint sensors. The wireless transceiver 826 can be a Wi-Fi transceiver, a Bluetooth transceiver, or a mobile network transceiver such as a 3G, 4G, 5G, or Long-Term Evolution (LTE) transceiver. The firmware interface 828 enables communication with system firmware, and can be, for example, a unified extensible firmware interface (UEFI). The network controller 834 can enable a network connection to a wired network. In some embodiments, a high-performance network controller (not shown) couples with the interface bus 810. The audio controller 846, in one embodiment, is a multi-channel high-definition audio controller. In one embodiment the processing system 800 includes an optional legacy I/O controller 840 for coupling legacy (e.g., Personal System 2 (PS/2)) devices to the system. The platform controller hub 830 can also connect to one or more Universal Serial Bus (USB) controllers 842 connect input devices, such as keyboard and mouse 843 combinations, a camera 844, or other USB input devices.

It will be appreciated that the processing system 800 shown is exemplary and not limiting, as other types of data processing systems that are differently configured may also be used. For example, an instance of the memory controller 816 and platform controller hub 830 may be integrated into a discrete external graphics processor, such as the external graphics processor 818. In one embodiment the platform controller hub 830 and/or memory controller 816 may be external to the one or more processor(s) 802. For example, the processing system 800 can include an external memory controller 816 and platform controller hub 830, which may be configured as a memory controller hub and peripheral controller hub within a system chipset that is in communication with the processor(s) 802.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling. Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to processing system 800 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 9A:
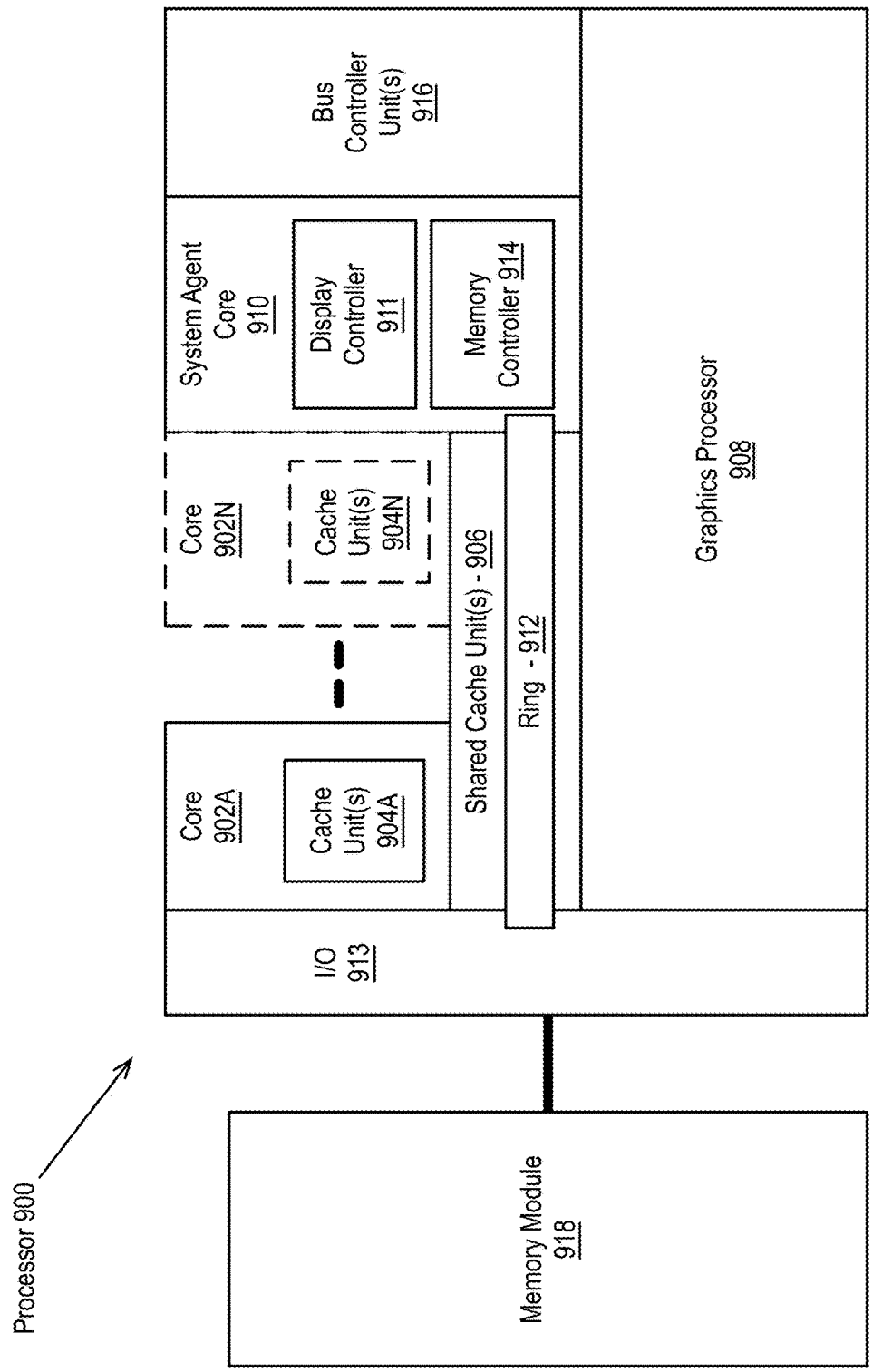
FIG. 9A-9B illustrate computing systems and graphics processors provided by embodiments described herein.
Figure 9B:
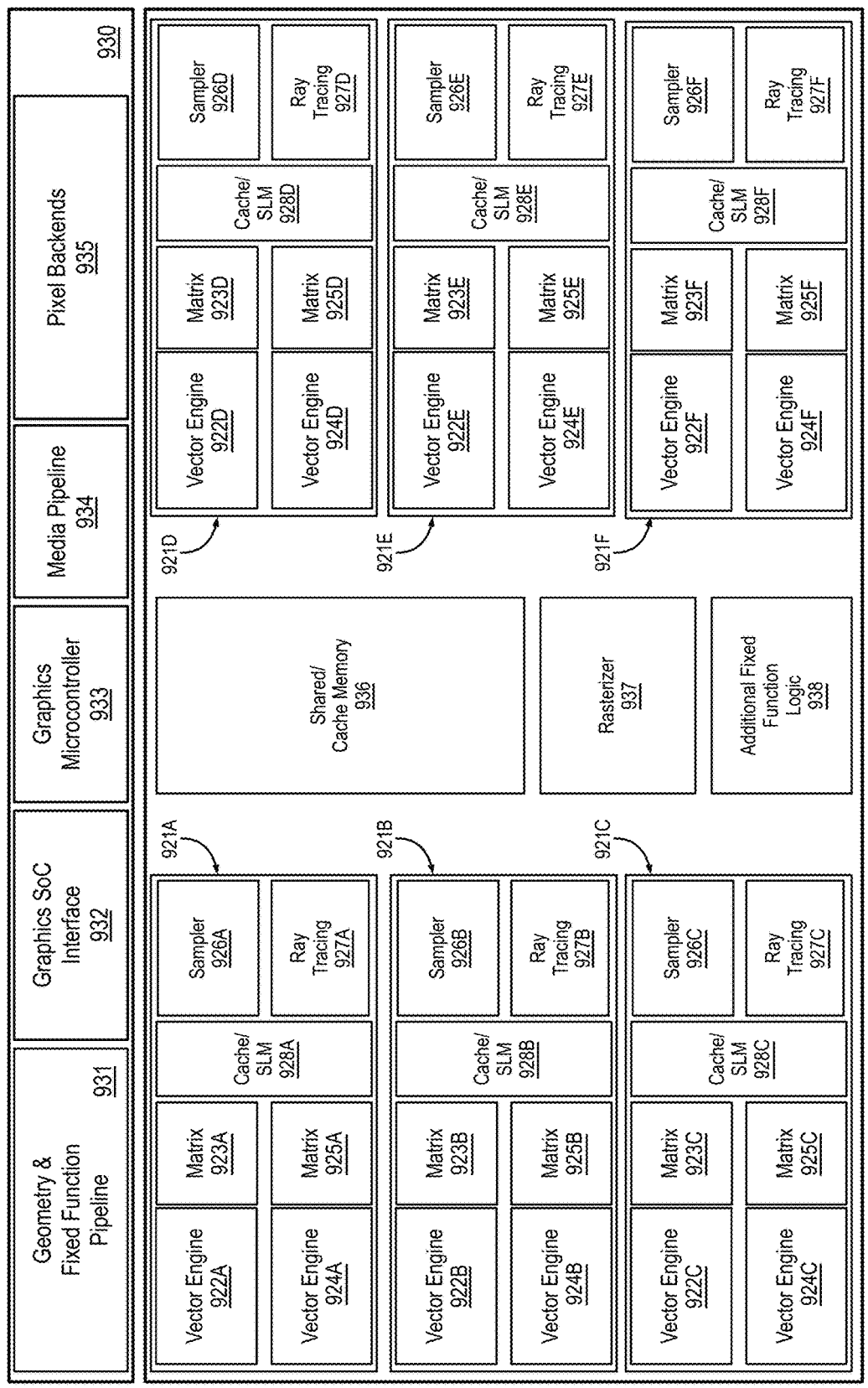

FIG. 9A-9B illustrate computing systems and graphics processors provided by embodiments described herein. The elements of FIG. 9A-9B having the same reference numbers (or names) as the elements of any other figure herein can operate or function in any manner similar to that described elsewhere herein but are not limited to such.

FIG. 9A is a block diagram of an embodiment of a processor 900 having one or more processor cores 902A-902N, one or more integrated memory controllers 914, and an integrated graphics processor 908. Processor 900 includes at least one core 902A and can additionally include additional cores up to and including additional core 902N, as represented by the dashed lined boxes. Each of processor cores 902A-902N includes one or more internal cache units 904A-904N. In some embodiments each processor core also has access to one or more shared cached units 906. The internal cache units 904A-904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A-904N.

In some embodiments, processor 900 may also include a set of one or more bus controller units 916 and a system agent core 910. The one or more bus controller units 916 manage a set of peripheral buses, such as one or more PCI or PCI express busses. System agent core 910 provides management functionality for the various processor components. In some embodiments, system agent core 910 includes one or more integrated memory controllers 914 to manage access to various external memory devices (not shown).

In some embodiments, one or more of the processor cores 902A-902N include support for simultaneous multi-threading. In such embodiment, the system agent core 910 includes components for coordinating and operating cores 902A-902N during multi-threaded processing. System agent core 910 may additionally include a power control unit (PCU), which includes logic and components to regulate the power state of processor cores 902A-902N and graphics processor 908.

In some embodiments, processor 900 additionally includes a graphics processor 908 to execute graphics processing operations. In some embodiments, the graphics processor 908 couples with the set of shared cache units 906, and the system agent core 910, including the one or more integrated memory controllers 914. In some embodiments, the system agent core 910 also includes a display controller 911 to drive graphics processor output to one or more coupled displays. In some embodiments, display controller 911 may also be a separate module coupled with the graphics processor via at least one interconnect, or may be integrated within the graphics processor 908.

In some embodiments, a ring-based interconnect 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring-based interconnect 912 via an I/O link 913.

The exemplary I/O link 913 represents at least one of multiple varieties of I/O interconnects, including an on package I/O interconnect which facilitates communication between various processor components and a memory module 918, such as an eDRAM module or high-bandwidth memory (HBM) memory modules. In one embodiment the memory module 918 can be an eDRAM module and each of the processor cores 902A-902N and graphics processor 908 can use the memory module 918 as a shared LLLC. In one embodiment, the memory module 918 is an HBM memory module that can be used as a primary memory module or as part of a tiered or hybrid memory system that also includes double data rate synchronous DRAM, such as DDR5 SDRAM, and/or persistent memory (PMem). The processor 900 can include multiple instances of the I/O link 913 and memory module 918.

In some embodiments, processor cores 902A-902N are homogenous cores executing the same instruction set architecture. In another embodiment, processor cores 902A-902N are heterogeneous in terms of instruction set architecture (ISA), where one or more of processor cores 902A-902N execute a first instruction set, while at least one of the other cores executes a subset of the first instruction set or a different instruction set. In one embodiment, processor cores 902A-902N are heterogeneous in terms of microarchitecture, where one or more cores having a relatively higher power consumption couple with one or more power cores having a lower power consumption. In one embodiment, processor cores 902A-902N are heterogeneous in terms of computational capability. Additionally, processor 900 can be implemented on one or more chips or as an SoC (system-on-a-chip) integrated circuit having the illustrated components, in addition to other components.

FIG. 9B is a block diagram of hardware logic of a graphics processor core block 919, according to some embodiments described herein. The graphics processor core block 919 is exemplary of one partition of a graphics processor. A graphics processor as described herein may include multiple graphics core blocks based on target power and performance envelopes. Each graphics processor core block 919 can include a function block 930 coupled with multiple execution cores 921A-921F that include modular blocks of fixed function logic and general-purpose programmable logic. The graphics processor core block 919 also includes shared/cache memory 936 that is accessible by all execution cores 921A-921F, rasterizer logic 937, and additional fixed function logic 938.

In some embodiments, the function block 930 includes a geometry/fixed function pipeline 931 that can be shared by all execution cores in the graphics processor core block 919. In various embodiments, the geometry/fixed function pipeline 931 includes a 3D geometry pipeline a video front-end unit, a thread spawner and global thread dispatcher, and a unified return buffer manager, which manages unified return buffers. In one embodiment the function block 930 also includes a graphics SoC interface 932, a graphics microcontroller 933, and a media pipeline 934. The graphics SoC interface 932 provides an interface between the graphics processor core block 919 and other core blocks within a graphics processor or compute accelerator SoC. The graphics microcontroller 933 is a programmable sub-processor that is configurable to manage various functions of the graphics processor core block 919, including thread dispatch, scheduling, and pre-emption. The media pipeline 934 includes logic to facilitate the decoding, encoding, pre-processing, and/or post-processing of multimedia data, including image and video data. The media pipeline 934 implement media operations via requests to compute or sampling logic within the execution cores 921-921F. One or more pixel backends 935 can also be included within the function block 930. The pixel backends 935 include a cache memory to store pixel color values and can perform blend operations and lossless color compression of rendered pixel data.

In one embodiment the SoC interface 932 enables the graphics processor core block 919 to communicate with general-purpose application processor cores (e.g., CPUs) and/or other components within an SoC or a system host CPU that is coupled with the SoC via a peripheral interface. The SoC interface 932 also enables communication with off-chip memory hierarchy elements such as a shared last level cache memory, system RAM, and/or embedded on-chip or on-package DRAM. The SoC interface 932 can also enable communication with fixed function devices within the SoC, such as camera imaging pipelines, and enables the use of and/or implements global memory atomics that may be shared between the graphics processor core block 919 and CPUs within the SoC. The SoC interface 932 can also implement power management controls for the graphics processor core block 919 and enable an interface between a clock domain of the graphics processor core block 919 and other clock domains within the SoC. In one embodiment the SoC interface 932 enables receipt of command buffers from a command streamer and global thread dispatcher that are configured to provide commands and instructions to each of one or more graphics cores within a graphics processor. The commands and instructions can be dispatched to the media pipeline 934 when media operations are to be performed, the geometry and fixed function pipeline 931 when graphics processing operations are to be performed. When compute operations are to be performed, compute dispatch logic can dispatch the commands to the execution cores 921A-921F, bypassing the geometry and media pipelines.

The graphics microcontroller 933 can be configured to perform various scheduling and management tasks for the graphics processor core block 919. In one embodiment the graphics microcontroller 933 can perform graphics and/or compute workload scheduling on the various graphics parallel engines within execution unit (EU) arrays 922A-922F, 924A-924F within the execution cores 921A-921F. In this scheduling model, host software executing on a CPU core of an SoC including the graphics processor core block 919 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 933 can also facilitate low-power or idle states for the graphics processor core block 919, providing the graphics processor core block 919 with the ability to save and restore registers within the graphics processor core block 919 across low-power state transitions independently from the operating system and/or graphics driver software on the system.

The graphics processor core block 919 may have greater than or fewer than the illustrated execution cores 921A-921F, up to N modular execution cores. For each set of N execution cores, the graphics processor core block 919 can also include shared/cache memory 936, which can be configured as shared memory or cache memory, rasterizer logic 937, and additional fixed function logic 938 to accelerate various graphics and compute processing operations.

Within each execution cores 921A-921F is set of execution resources that may be used to perform graphics, media, and compute operations in response to requests by graphics pipeline, media pipeline, or shader programs. The graphics execution cores 921A-921F include multiple vector engines 922A-922F, 924A-924F, matrix acceleration units 923A-923F, 925A-925D, cache/shared local memory (SLM), a sampler 926A-926F, and a ray tracing unit 927A-927F.

The vector engines 922A-922F, 924A-924F are general-purpose graphics processing units capable of performing floating-point and integer/fixed-point logic operations in service of a graphics, media, or compute operation, including graphics, media, or compute/GPGPU programs. The vector engines 922A-922F, 924A-924F can operate at variable vector widths using SIMD, SIMT, or SIMT+SIMD execution modes. The matrix acceleration units 923A-923F, 925A-925D include matrix-matrix and matrix-vector acceleration logic that improves performance on matrix operations, particularly low and mixed precision (e.g., INT8, FP16) matrix operations used for machine learning. In one embodiment, each of the matrix acceleration units 923A-923F, 925A-925D includes one or more systolic arrays of processing elements that can perform concurrent matrix multiply or dot product operations on matrix elements.

The sampler 925A-925F can read media or texture data into memory and can sample data differently based on a configured sampler state and the texture/media format that is being read. Threads executing on the vector engines 922A-922F, 924A-924F or matrix acceleration units 923A-923F, 925A-925D can make use of the cache/SLM 928A-928F within each execution core. The cache/SLM 928A-928F can be configured as cache memory or as a pool of shared memory that is local to each of the respective execution cores 921A-921F. The ray tracing units 927A-927F within the execution cores 921A-921F include ray traversal/intersection circuitry for performing ray traversal using bounding volume hierarchies (BVHs) and identifying intersections between rays and primitives enclosed within the BVH volumes. In one embodiment the ray tracing units 927A-927F include circuitry for performing depth testing and culling (e.g., using a depth buffer or similar arrangement). In one implementation, the ray tracing units 927A-927F perform traversal and intersection operations in concert with image denoising, at least a portion of which may be performed using an associated matrix acceleration unit 923A-923F, 925A-925D.

Figure 10A:
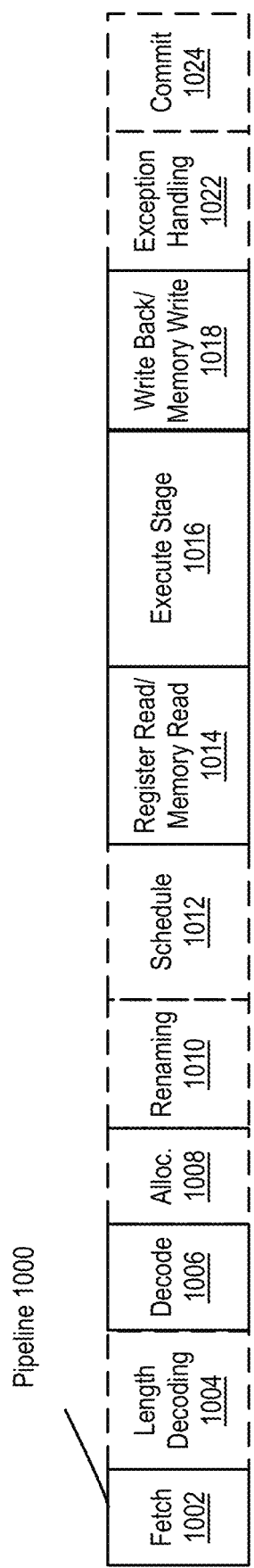
FIG. 10A-10B illustrate an exemplary in-order pipeline and an exemplary register renaming, out-of-order issue/execution pipeline of a processor and an associated processor architecture.
Figure 10B:
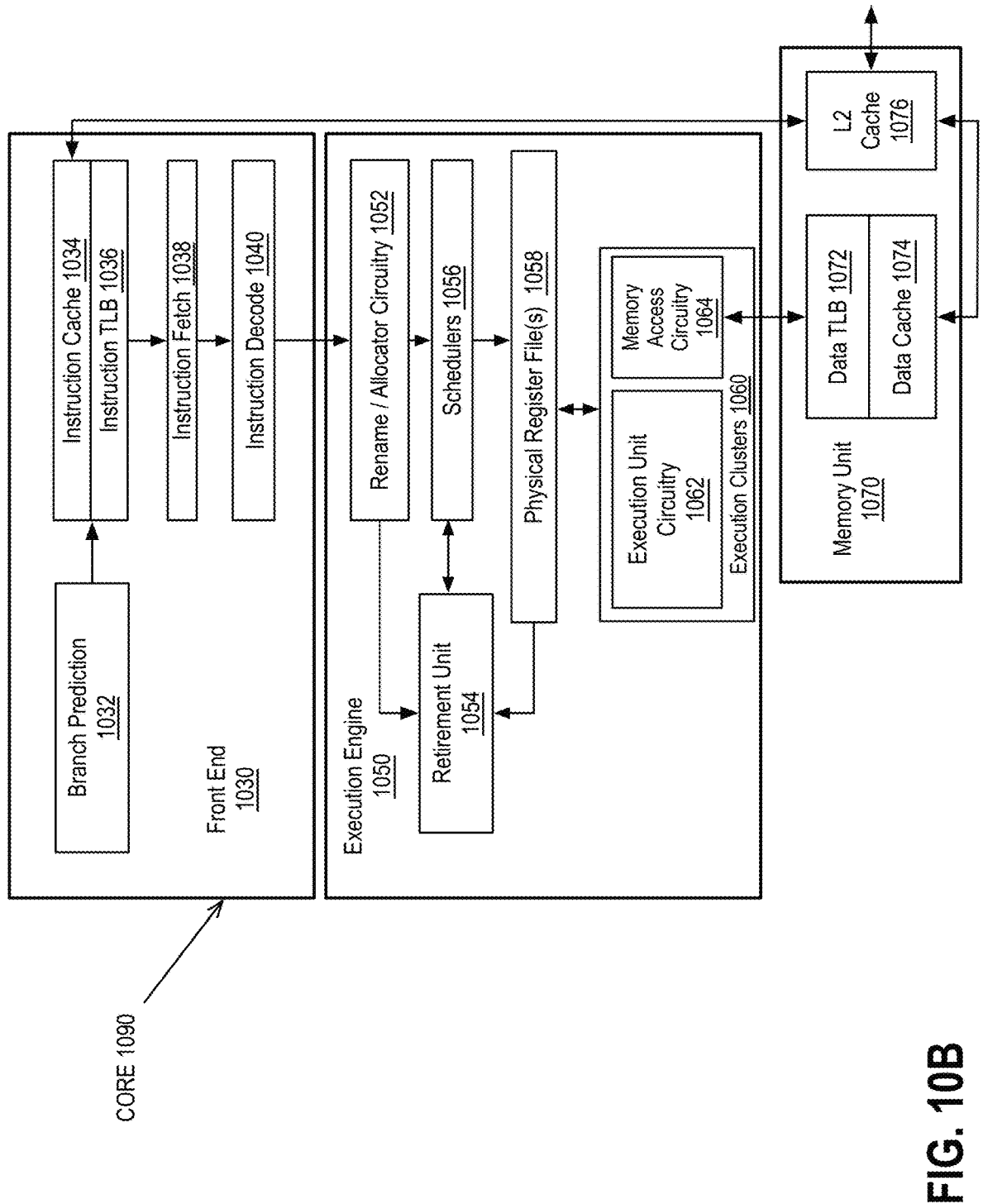

FIG. 10A is a block diagram illustrating an exemplary in-order pipeline and an exemplary register renaming, out-of-order issue/execution pipeline of a processor described herein. FIG. 10B is a block diagram illustrating architecture for a processor core that can be configured as an in-order architecture core or a register renaming, out-of-order issue/execution architecture core. Given that the in-order aspect is a subset of the out-of-order aspect, the out-of-order aspect will be described.

As shown in FIG. 10A, a processor pipeline 1000 includes a fetch stage 1002, an optional length decode stage 1004, a decode stage 1006, an optional allocation stage 1008, an optional renaming stage 1010, a scheduling (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, during the decode stage 1006, the one or more fetched instructions may be decoded, addresses (e.g., load store unit (LSU) addresses) using forwarded register ports may be generated, and branch forwarding (e.g., immediate offset or link register (LR)) may be performed. In one embodiment, the decode stage 1006 and the register read/memory read stage 1014 may be combined into one pipeline stage. In one embodiment, during the execute stage 1016, the decoded instructions may be executed, LSU address/data pipelining to an Advanced Microcontroller Bus (AHB) interface may be performed, multiply and add operations may be performed, arithmetic operations with branch results may be performed, etc.

As shown in FIG. 10B a processor core 1090 can include front end unit circuitry 1030 coupled to execution engine circuitry 1050, both of which are coupled to memory unit circuitry 1070. The processor core 1090 can be one of processor cores 902A-902N as in FIG. 9A. The processor core 1090 may be a reduced instruction set computing (RISC) core, a complex instruction set computing (CISC) core, a very long instruction word (VLIW) core, or a hybrid or alternative core type. As yet another option, the processor core 1090 may be a special-purpose core, such as, for example, a network or communication core, compression engine, coprocessor core, general purpose computing graphics processing unit (GPGPU) core, graphics core, or the like.

The front end unit circuitry 1030 may include branch prediction unit circuitry 1032 coupled to an instruction cache unit circuitry 1034, which is coupled to an instruction translation lookaside buffer (TLB) 1036, which is coupled to instruction fetch unit circuitry 1038, which is coupled to decode unit circuitry 1040. In one embodiment, the instruction cache unit circuitry 1034 is included in the memory unit circuitry 1070 rather than the front end unit circuitry 1030. The decode unit circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1040 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the processor core 1090 includes a microcode ROM (not shown) or other medium that stores microcode for certain macroinstructions (e.g., in decode unit circuitry 1040 or otherwise within the front end unit circuitry 1030). In one embodiment, the decode unit circuitry 1040 includes a micro-operation (micro-op) or operation cache (not shown) to hold/cache decoded operations, micro-tags, or micro-operations generated during the decode or other stages of the processor pipeline 1000. The decode unit circuitry 1040 may be coupled to rename/allocator unit circuitry 1052 in the execution engine circuitry 1050.

The execution engine circuitry 1050 includes the rename/allocator unit circuitry 1052 coupled to a retirement unit circuitry 1054 and a set of one or more scheduler(s) circuitry 1056. The scheduler(s) circuitry 1056 represents any number of different schedulers, including reservations stations, central instruction window, etc. In some embodiments, the scheduler(s) circuitry 1056 can include arithmetic logic unit (ALU) scheduler/scheduling circuitry, ALU queues, arithmetic generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is overlapped by the retirement unit circuitry 1054 (also known as a retire queue or a retirement queue) to illustrate various ways in which register renaming and out-of-order execution may be implemented (e.g., using a reorder buffer(s) (ROB (s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit circuitry 1062 and a set of one or more memory access circuitry 1064. The execution unit circuitry 1062 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1064). It should also be understood that where separate pipelines are used, one or more of these pipelines may be out-of-order issue/execution and the rest in-order.

In some embodiments, the execution engine circuitry 1050 may perform load store unit (LSU) address/data pipelining to an Advanced Microcontroller Bus (AHB) interface (not shown), and address phase and writeback, data phase load, store, and branches.

The set of memory access circuitry 1064 is coupled to the memory unit circuitry 1070, which includes data TLB unit circuitry 1072 coupled to a data cache circuitry 1074 coupled to a level 2 (L2) cache circuitry 1076. In one exemplary embodiment, the memory access circuitry 1064 may include a load unit circuitry, a store address unit circuit, and a store data unit circuitry, each of which is coupled to the data TLB unit circuitry 1072 in the memory unit circuitry 1070. The instruction cache circuitry 1034 is further coupled to level 2 (L2) cache circuitry 1076 in the memory unit circuitry 1070. In one embodiment, the instruction cache circuitry 1034 and the data cache circuitry 1074 are combined into a single instruction and data cache (not shown) in L2 cache circuitry 1076, a level 3 (L3) cache unit circuitry (not shown), and/or main memory. The L2 cache circuitry 1076 is coupled to one or more other levels of cache and eventually to a main memory.

The processor core 1090 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the processor core 1090 includes logic to support a packed data instruction set extension (e.g., AVX1, AVX2, AVX512), thereby allowing the operations used by many multimedia applications or high-performance compute applications, including homomorphic encryption applications, to be performed using packed or vector data types.

The processor core 1090 of FIG. 10B can implement the processor pipeline 1000 of FIG. 10A as follows: 1) the instruction fetch circuitry 1038 performs the fetch and length decoding stages 1002 and 1004; 2) the instruction decode unit circuitry 1040 performs the decode stage 1006; 3) the rename/allocator unit circuitry 1052 performs the allocation stage 1008 and renaming stage 1010; 4) the scheduler unit(s) circuitry 1056 performs the schedule stage 1012; 5) the physical register file(s) circuitry 1058 and the memory unit circuitry 1070 perform the register read/memory read stage 1014; the execution cluster 1060 perform the execute stage 1016; 6) the memory unit circuitry 1070 and the physical register file(s) circuitry 1058 perform the write back/memory write stage 1018; 7) various units (unit circuitry) may be involved in the exception handling stage 1022; and 8) the retirement unit circuitry 1054 and the physical register file(s) circuitry 1058 perform the commit stage 1024.

Figure 11:
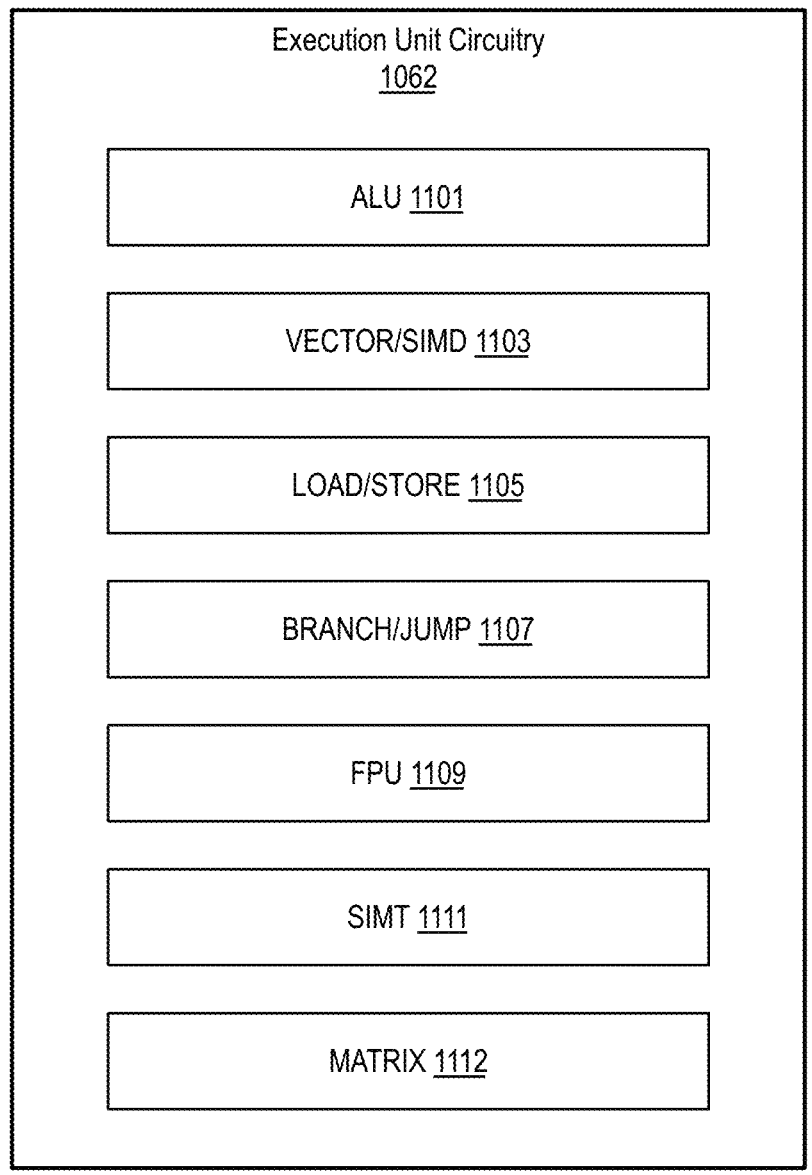
FIG. 11 illustrates execution unit circuitry according to embodiments described herein.

FIG. 11 illustrates execution unit circuitry, such as execution unit circuitry 1062 of FIG. 10B, according to embodiments described herein. As illustrated, execution unit circuitry 1062 may include one or more ALU circuits 1101, vector/SIMD unit circuits 1103, load/store unit circuits 1105, branch/jump unit circuits 1107, and/or FPU circuits 1109. Where the execution unit circuitry 1062 is configurable to perform GPGPU parallel compute operations, the execution unit circuitry can additionally include SIMT circuits 1111 and/or matrix acceleration circuits 1112. ALU circuits 1101 perform integer arithmetic and/or Boolean operations. Vector/SIMD unit circuits 1103 perform vector/SIMD operations on packed data (such as SIMD/vector registers). Load/store unit circuits 1105 execute load and store instructions to load data from memory into registers or store from registers to memory. Load/store unit circuits 1105 may also generate addresses. Branch/jump unit circuits 1107 cause a branch or jump to a memory address depending on the instruction. FPU circuits 1109 perform floating-point arithmetic. In some embodiments, SIMT circuits 1111 enable the execution unit circuitry 1062 to execute SIMT GPGPU compute programs using one or more ALU circuits 1101 and/or Vector/SIMD unit circuits 1103. In some embodiments, execution unit circuitry 1062 includes matrix acceleration circuits 1112 including hardware logic of one or more of the matrix acceleration units 923A-923F, 925A-925D of FIG. 9B. The width of the execution unit(s) circuitry 1062 varies depending upon the embodiment and can range from 16 bits to 4,096 bits. In some embodiments, two or more smaller execution units are logically combined to form a larger execution unit (e.g., two 128-bit execution units are logically combined to form a 256-bit execution unit).

Figure 12:
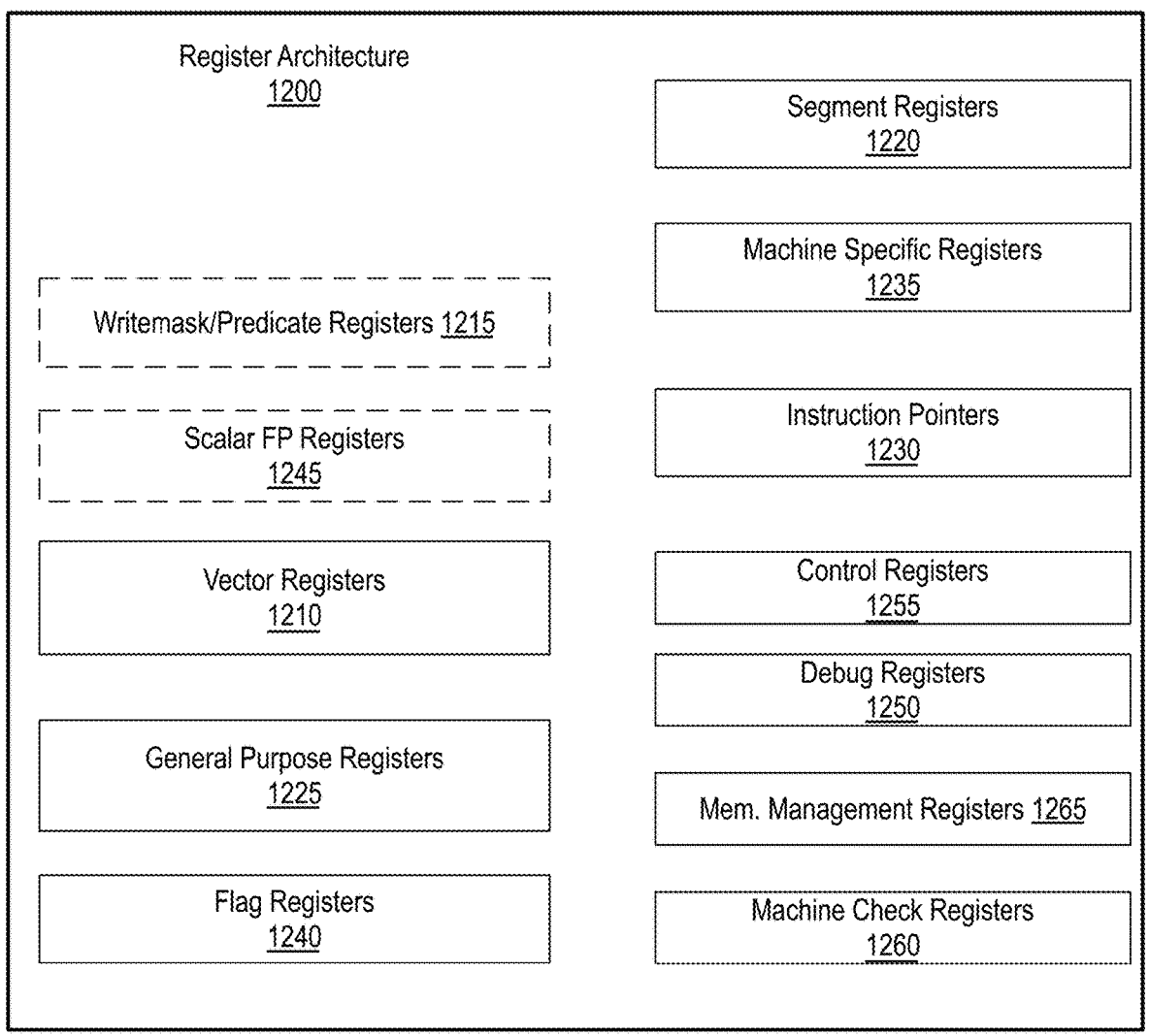
FIG. 12 is a block diagram of a register architecture according to some embodiments.

FIG. 12 is a block diagram of a register architecture 1200 according to some embodiments. As illustrated, there are vector registers 1210 that vary from 128-bit to 1,024 bits width. In some embodiments, the vector registers 1210 are physically 512-bits and, depending upon the mapping, only some of the lower bits are used. For example, in some embodiments, the vector registers 1210 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1200 includes writemask/predicate registers 1215. For example, in some embodiments, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1215 corresponds to a data element position of the destination. In other embodiments, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1200 includes scalar floating-point register 1245 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some embodiments, the one or more flag registers 1240 are called program status and control registers.

Segment registers 1220 contain segment points for use in accessing memory. In some embodiments, these registers are referenced by the names CS, DS, SS, ES, FS, and GS.

Machine specific registers (MSRs) 1235 control and report on processor performance. Most MSRs 1235 handle system related functions and are not accessible to an application program. Machine check registers 1260 consist of control, status, and error reporting MSRs that are used to detect and report on hardware errors.

One or more instruction pointer registers 1230 store an instruction pointer value. Control register(s) 1255 (e.g., CR0-CR4) determine the operating mode of a processor and the characteristics of a currently executing task. Debug registers 1250 control and allow for the monitoring of a processor or core's debugging operations.

Memory management registers 1265 specify the locations of data structures used in protected mode memory management. These registers may include a GDTR, IDRT, task register, and a LDTR register.

Alternative embodiments use wider or narrower registers and can also use more, less, or different register files and registers.

Exemplary Instruction Formats

Instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figures 13, 14:
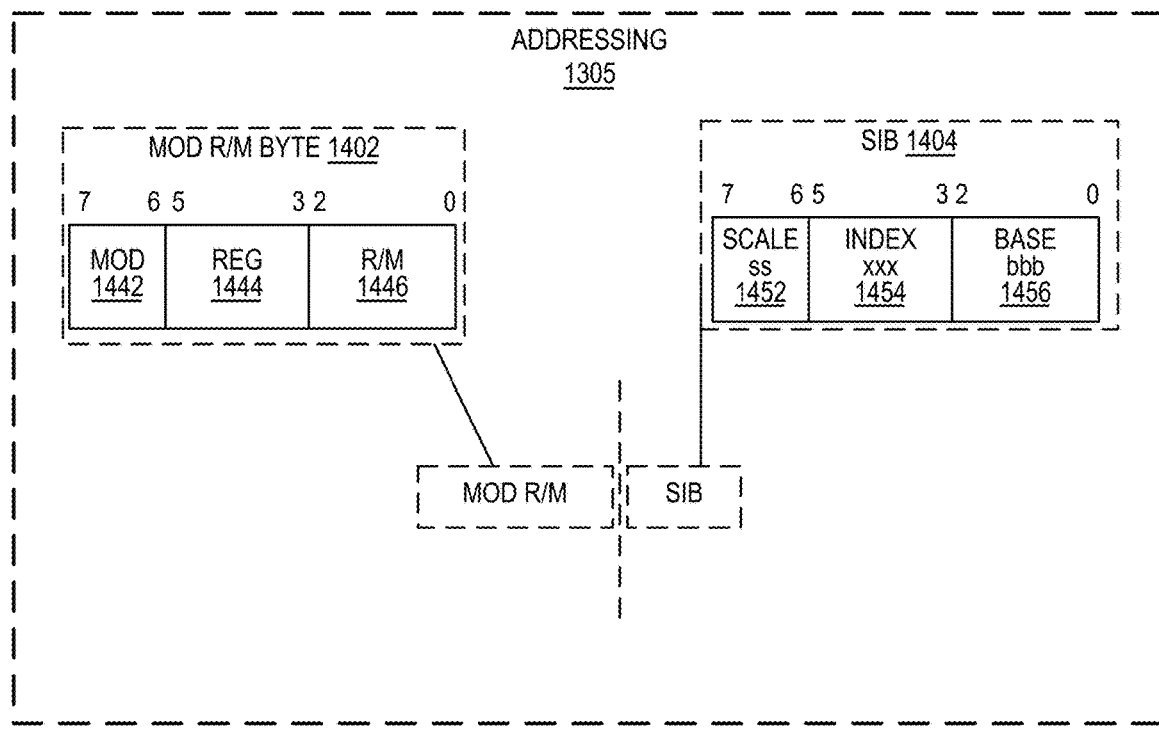
FIG. 13 illustrates embodiments of an instruction format, according to an embodiment.
FIG. 14 illustrates embodiments of the addressing field of the instruction format.

FIG. 13 illustrates embodiments of an instruction format, according to an embodiment. As illustrated, an instruction may include multiple components including, but not limited to one or more fields for: one or more prefixes 1301, an opcode 1303, addressing information 1305 (e.g., register identifiers, memory addressing information, etc.), a displacement value 1307, and/or an immediate 1309. Note that some instructions utilize some or all of the fields of the format whereas others may only use the field for the opcode 1303. In some embodiments, the order illustrated is the order in which these fields are to be encoded, however, it should be appreciated that in other embodiments these fields may be encoded in a different order, combined, etc.

The prefix(es) field(s) 1301, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1303 is used to at least partially define the operation to be performed upon a decoding of the instruction. In some embodiments, a primary opcode encoded in the opcode field 1303 is 1, 2, or 3 bytes in length. In other embodiments, a primary opcode can be a different length. An additional 3-bit opcode field is sometimes encoded in another field.

The addressing field 1305 is used to address one or more operands of the instruction, such as a location in memory or one or more registers.

FIG. 14 illustrates embodiments of the addressing field 1305. In this illustration, an optional ModR/M byte 1402 and an optional Scale, Index, Base (SIB) byte 1404 are shown. The ModR/M byte 1402 and the SIB byte 1404 are used to encode up to two operands of an instruction, each of which is a direct register or effective memory address. Note that each of these fields are optional in that not all instructions include one or more of these fields. The MOD R/M byte 1402 includes a MOD field 1442, a register field 1444, and R/M field 1446.

The content of the MOD field 1442 distinguishes between memory access and non-memory access modes. In some embodiments, when the MOD field 1442 has a value of b11, a register-direct addressing mode is utilized, and otherwise register-indirect addressing is used.

The register field 1444 may encode either the destination register operand or a source register operand or may encode an opcode extension and not be used to encode any instruction operand. The content of register index field 1444, directly or through address generation, specifies the locations of a source or destination operand (either in a register or in memory). In some embodiments, the register field 1444 is supplemented with an additional bit from a prefix (e.g., prefix 1301) to allow for greater addressing.

The R/M field 1446 may be used to encode an instruction operand that references a memory address or may be used to encode either the destination register operand or a source register operand. Note the R/M field 1446 may be combined with the MOD field 1442 to dictate an addressing mode in some embodiments.

The SIB byte 1404 includes a scale field 1452, an index field 1454, and a base field 1456 to be used in the generation of an address. The scale field 1452 indicates scaling factor. The index field 1454 specifies an index register to use. In some embodiments, the index field 1454 is supplemented with an additional bit from a prefix (e.g., prefix 1301) to allow for greater addressing. The base field 1456 specifies a base register to use. In some embodiments, the base field 1456 is supplemented with an additional bit from a prefix (e.g., prefix 1301) to allow for greater addressing. In practice, the content of the scale field 1452 allows for the scaling of the content of the index field 1454 for memory address generation (e.g., for address generation that uses $2^{scale}*\text{index}+\text{base}$).

Some addressing forms utilize a displacement value to generate a memory address. For example, a memory address may be generated according to $2^{scale}*\text{index}+\text{base}+\text{displacement}$, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1307 provides this value. Additionally, in some embodiments, a displacement factor usage is encoded in the MOD field of the addressing field 1305 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1307.

In some embodiments, an immediate field 1309 specifies an immediate for the instruction. An immediate may be encoded as a 1-byte value, a 2-byte value, a 4-byte value, etc.

Figure 15:
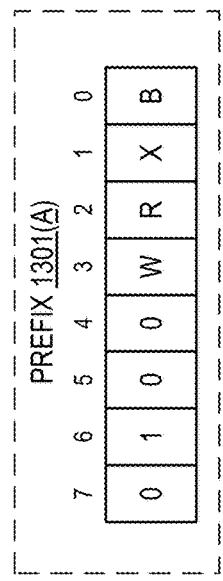
FIG. 15 illustrates embodiments of a first prefix of the instruction format.

FIG. 15 illustrates embodiments of a first prefix 1301(A). In some embodiments, the first prefix 1301(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1301(A) may specify up to three registers using 3-bit fields depending on the format: 1) using the reg field 1444 and the R/M field 1446 of the Mod R/M byte 1402; 2) using the Mod R/M byte 1402 with the SIB byte 1404 including using the reg field 1444 and the base field 1456 and index field 1454; or 3) using the register field of an opcode.

In the first prefix 1301(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1444 and MOD R/M R/M field 1446 alone can each only address 8 registers.

In the first prefix 1301(A), bit position 2 (R) may an extension of the MOD R/M reg field 1444 and may be used to modify the ModR/M reg field 1444 when that field encodes a general-purpose register, a 64-bit packed data register (e.g., a SSE register), or a control or debug register. R is ignored when Mod R/M byte 1402 specifies other registers or defines an extended opcode.

Bit position 1 (X) X bit may modify the SIB byte index field 1454.

Bit position B (B) B may modify the base in the Mod R/M R/M field 1446 or the SIB byte base field 1456; or it may modify the opcode register field used for accessing general purpose registers (e.g., general-purpose registers 1225).

Figure 16B:
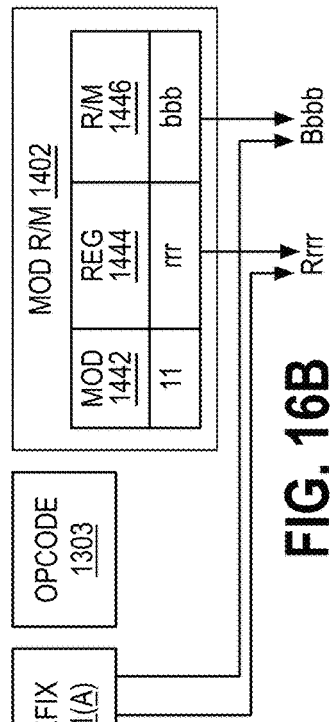
FIG. 16A-16D illustrate use of the R, X, and B fields of the first prefix, according to some embodiments.
Figure 16D:
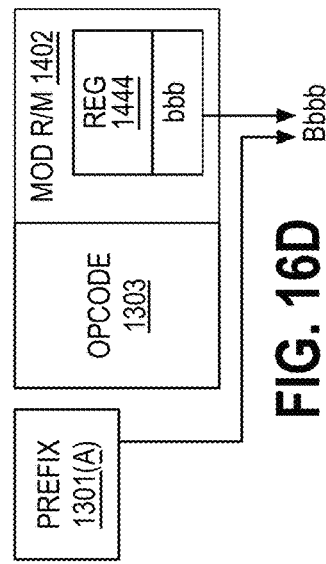
Figure 16A:
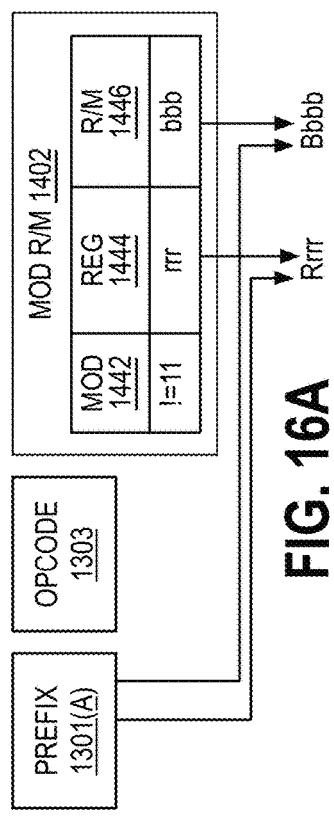
Figure 16C:
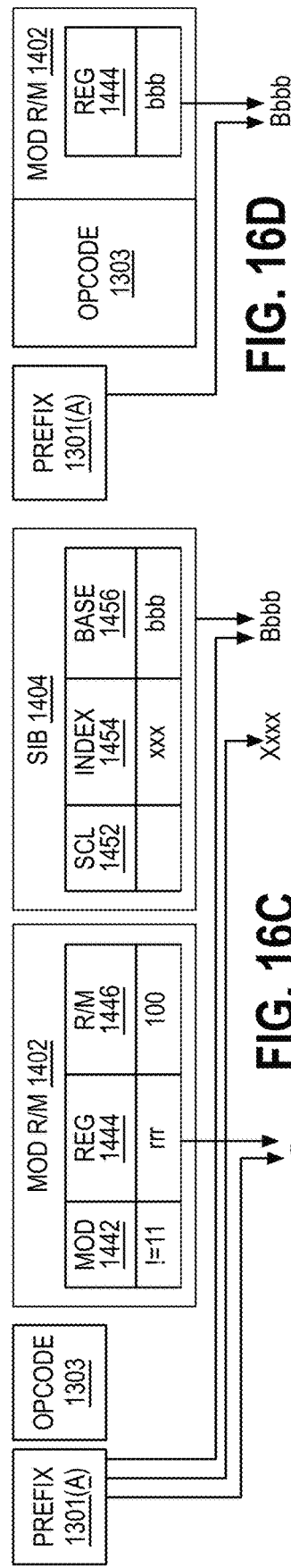

FIG. 16A-16D illustrate use of the R, X, and B fields of the first prefix 1301(A), according to some embodiments. FIG. 16A illustrates R and B from the first prefix 1301(A) being used to extend the reg field 1444 and R/M field 1446 of the MOD R/M byte 1402 when the SIB byte 14 04 is not used for memory addressing. FIG. 16B illustrates R and B from the first prefix 1301(A) being used to extend the reg field 1444 and R/M field 1446 of the MOD R/M byte 1402 when the SIB byte 14 04 is not used (register-register addressing). FIG. 16C illustrates R, X, and B from the first prefix 1301(A) being used to extend the reg field 1444 of the MOD R/M byte 1402 and the index field 1454 and base field 1456 when the SIB byte 14 04 being used for memory addressing. FIG. 16D illustrates B from the first prefix 1301(A) being used to extend the reg field 1444 of the MOD R/M byte 1402 when a register is encoded in the opcode 1303.

Figure 17A:
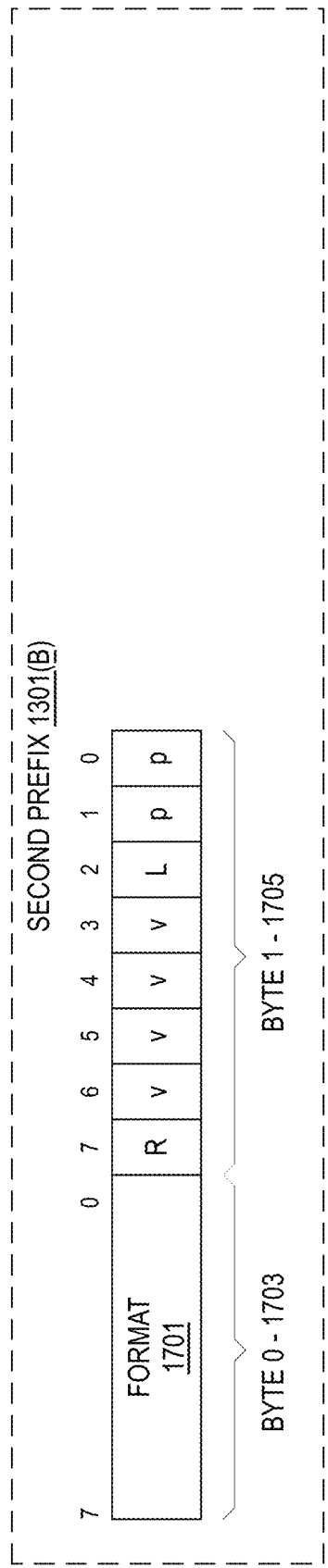
FIG. 17A-17B illustrate a second prefix, according to embodiments.
Figure 17B:
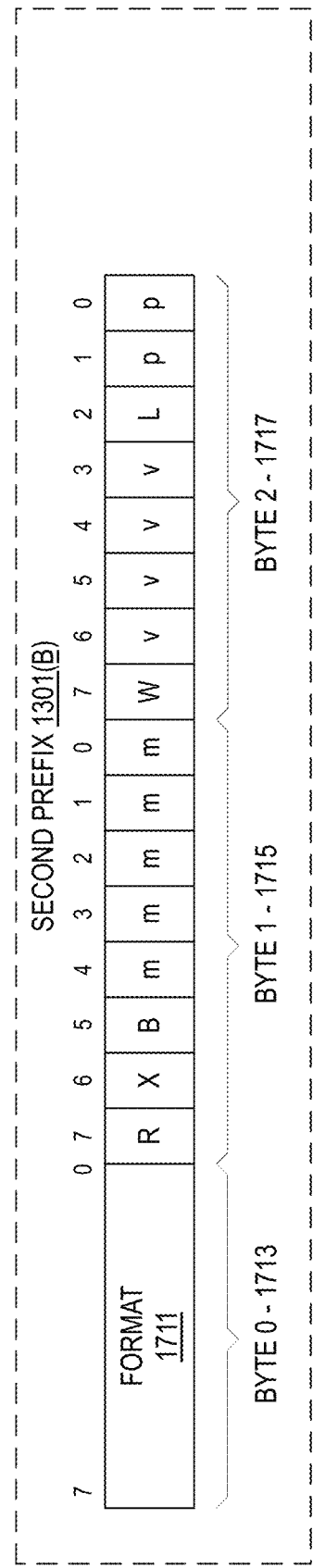

FIG. 17A-17B illustrate a second prefix 1301(B), according to embodiments. In some embodiments, the second prefix 1301(B) is an embodiment of a VEX prefix. The second prefix 1301(B) encoding allows instructions to have more than two operands, and allows SIMD vector registers (e.g., vector registers 1210) to be longer than 64-bits (e.g., 128-bit and 256-bit). The use of the second prefix 1301(B) provides for three-operand (or more) syntax. For example, previous two-operand instructions performed operations such as A=A+B, which overwrites a source operand. The use of the second prefix 1301(B) enables operands to perform nondestructive operations such as A=B+C.

In some embodiments, the second prefix 1301(B) comes in two forms—a two-byte form and a three-byte form. The two-byte second prefix 1301(B) is used mainly for 128-bit, scalar, and some 256-bit instructions; while the three-byte second prefix 1301(B) provides a compact replacement of the first prefix 1301(A) and 3-byte opcode instructions.

FIG. 17A illustrates embodiments of a two-byte form of the second prefix 1301(B). In one example, a format field 1701 (byte 0 1703) contains the value C5H. In one example, byte 1 1705 includes a "R" value in bit [7]. This value is the complement of the same value of the first prefix 1301(A). Bit [2] is used to dictate the length (L) of the vector (where a value of 0 is a scalar or 128-bit vector and a value of 1 is a 256-bit vector). Bits [1:0] provide opcode extensionality equivalent to some legacy prefixes (e.g., 00=no prefix, 01=66H, 10=F3H, and 11=F2H). Bits [6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111*b*.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits [7:4] of the immediate 1309 are then used to encode the third source register operand.

FIG. 17B illustrates embodiments of a three-byte form of the second prefix 1301(B). in one example, a format field 1711 (byte 0 1713) contains the value C4H. Byte 1 1715 includes in bits [7:5] "R," "X," and "B" which are the complements of the same values of the first prefix 1301(A). Bits [4:0] of byte 1 1715 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit [7] of byte 2 1717 is used similar to W of the first prefix 1301(A) including helping to determine promotable operand sizes. Bit [2] is used to dictate the length (L) of the vector (where a value of 0 is a scalar or 128-bit vector) and a value of 1 is a 256-bit vector). Bits [1:0] provide opcode extensionality equivalent to some legacy prefixes (e.g., 00=no prefix, 01=66H, 10=F3H, and 11=F2H). Bits [6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits [7:4] of the immediate 1309 are then used to encode the third source register operand.

Figure 18:
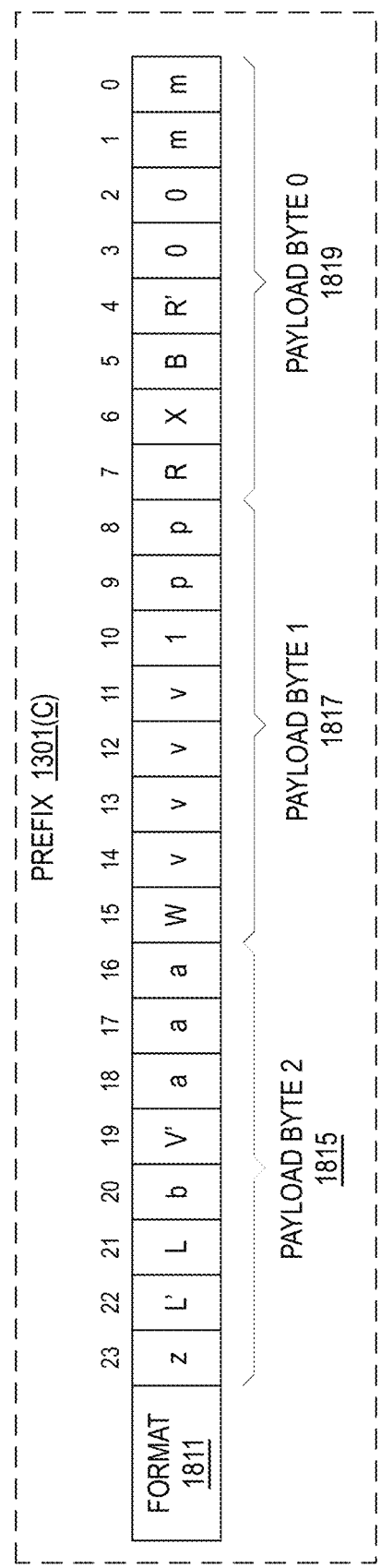
FIG. 18 illustrates a third prefix, according to embodiments.

FIG. 18 illustrates embodiments of a third prefix 1301(C). In some embodiments, the first prefix 1301(A) is an embodiment of an EVEX prefix. The third prefix 1301(C) is a four-byte prefix.

The third prefix 1301(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 12) or predication utilize this prefix. Opmask register allow for conditional processing or selection control. Opmask instructions, whose source/destination operands are opmask registers and treat the content of an opmask register as a single value, are encoded using the second prefix 1301(B).

The third prefix 1301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1301(C) is a format field 1811 that has a value, in one example, of 0x62, which is a unique value that identifies a vector friendly instruction format. Subsequent bytes are referred to as payload bytes 1815, 1817, 1819 and collectively form a 24-bit value of P[23:0] providing specific capability in the form of one or more fields (detailed herein).

In some embodiments, P[1:0] of payload byte 1819 are identical to the low two mmmmm bits. P[3:2] are reserved in some embodiments. Bit P[4] (R') allows access to the high 16 vector register set when combined with P[7] and the ModR/M reg field 1444. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 1444 and ModR/M R/M field 1446. P[9:8] provide opcode extensionality equivalent to some legacy prefixes (e.g., 00=no prefix, 01=0x66, 10=0xF3, and 11=0xF2). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1301(A) and second prefix 1301(B) and may serve as an opcode extension bit or operand size promotion.

P[18:16] specify the index of a register in the opmask (writemask) registers (e.g., writemask/predicate registers 1215). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 1301(C) are detailed in the following tables.

TABLE 2

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |

TABLE 2-continued

32-Register Support in 64-bit Mode

| | 4 | 3 | [2:0] | REG. TYPE | COMMON USAGES |
|---|---|---|---|---|---|
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 3

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | Vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 4

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | 2nd Source |
| RM | ModR/MR/M | k0-7 | 1st Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired, as the mechanisms described herein are not limited in scope to any particular programming language. Additionally, the language may be a compiled or interpreted language.

The mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

ISA Emulation and Binary Translation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
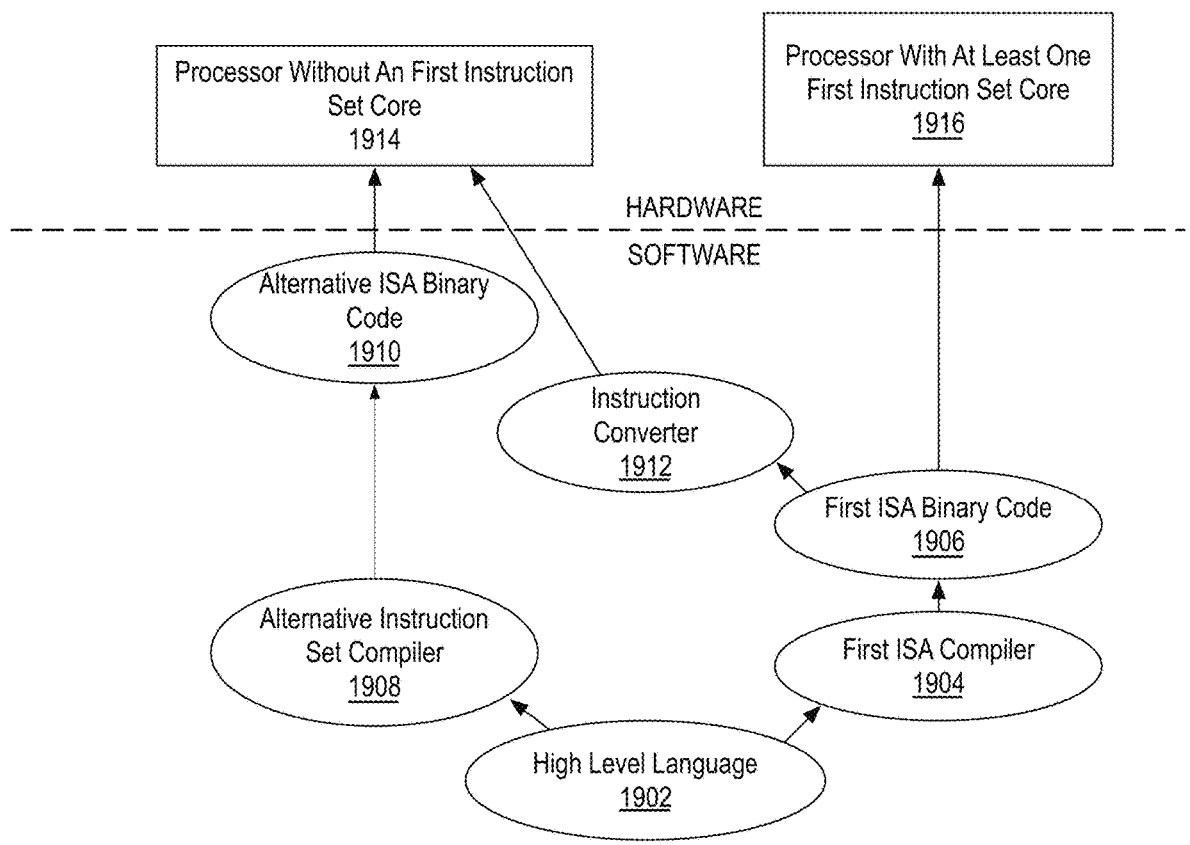
FIG. 19 illustrates a block diagram contrasting the use of a software instruction converter to convert binary instructions in a source instruction set to binary instructions in a target instruction set, according to an embodiment.

FIG. 19 illustrates a block diagram contrasting the use of a software instruction converter to convert binary instructions in a source instruction set to binary instructions in a target instruction set, according to an embodiment. In the illustrated embodiment, the instruction converter is a software instruction converter, although alternatively the instruction converter may be implemented in software, firmware, hardware, or various combinations thereof. FIG. 19 shows a program in a high-level language 1902 may be compiled using a first ISA compiler 1904 to generate first ISA binary code 1906 that may be natively executed by a processor with at least one first instruction set core 1916. The processor with at least one first ISA instruction set core 1916 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1904 represents a compiler that is operable to generate first ISA binary code 1906 (e.g., object code) that can, with or without additional linkage processing, be executed on the processor with at least one first ISA instruction set core 1916. Similarly, FIG. 19 shows the program in the high-level language 1902 may be compiled using an alternative instruction set compiler 1908 to generate alternative instruction set binary code 1910 that may be natively executed by a processor without a first ISA instruction set core 1914. The instruction converter 1912 is used to convert the first ISA binary code 1906 into code that may be natively executed by the processor without a first ISA instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have a first ISA instruction set processor or core to execute the first ISA binary code 1906.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

FIG. 20A-20D illustrate IP core development and associated package assemblies that can be assembled from diverse IP cores.

Figure 20A:
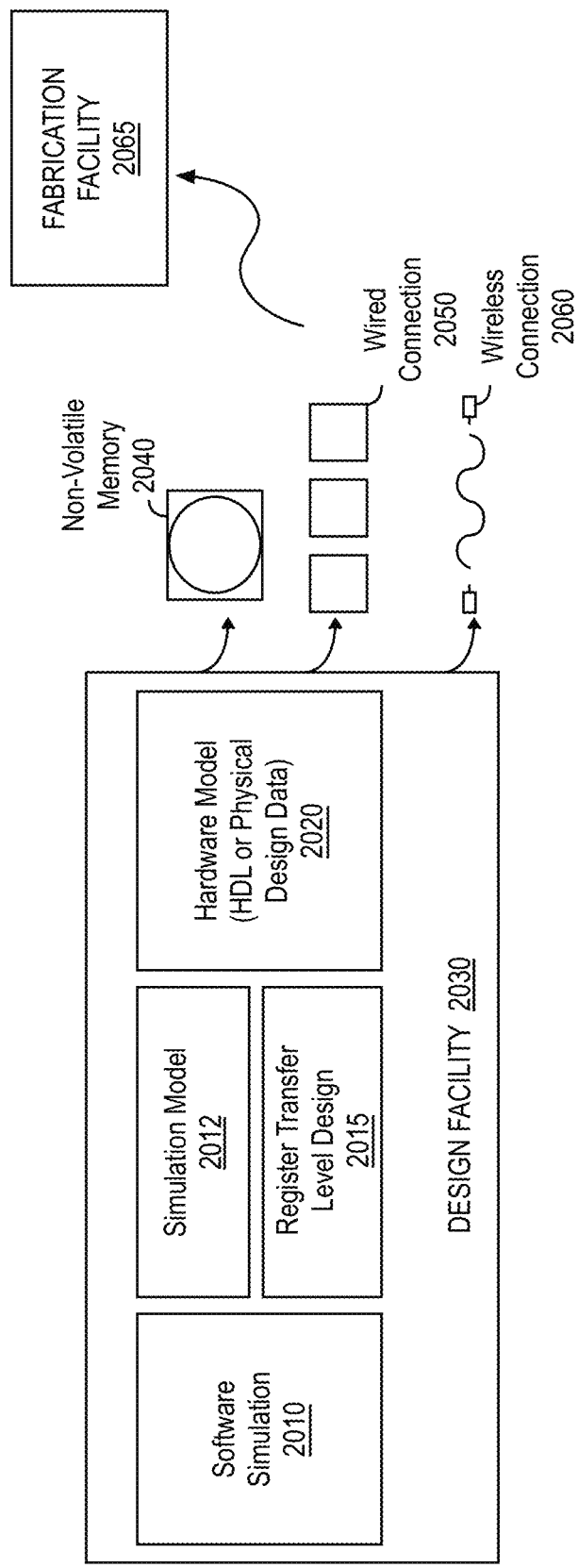
FIG. 20A-20D illustrate IP core development and associated package assemblies that can be assembled from diverse IP cores.

FIG. 20A is a block diagram illustrating an IP core development system 2000 that may be used to manufacture an integrated circuit to perform operations according to an embodiment. The IP core development system 2000 may be used to generate modular, re-usable designs that can be incorporated into a larger design or used to construct an entire integrated circuit (e.g., an SOC integrated circuit). A design facility 2030 can generate a software simulation 2010 of an IP core design in a high-level programming language (e.g., C/C++). The software simulation 2010 can be used to design, test, and verify the behavior of the IP core using a simulation model 2012. The simulation model 2012 may include functional, behavioral, and/or timing simulations. A register transfer level (RTL) design 2015 can then be created or synthesized from the simulation model 2012. The RTL design 2015 is an abstraction of the behavior of the integrated circuit that models the flow of digital signals between hardware registers, including the associated logic performed using the modeled digital signals. In addition to an RTL design 2015, lower-level designs at the logic level or transistor level may also be created, designed, or synthesized. Thus, the particular details of the initial design and simulation may vary.

The RTL design 2015 or equivalent may be further synthesized by the design facility into a hardware model 2020, which may be in a hardware description language (HDL), or some other representation of physical design data. The HDL may be further simulated or tested to verify the IP core design. The IP core design can be stored for delivery to a $3^{rd}$ party fabrication facility 2065 using non-volatile memory 2040 (e.g., hard disk, flash memory, or any non-volatile storage medium). Alternatively, the IP core design may be transmitted (e.g., via the Internet) over a wired connection 2050 or wireless connection 2060. The fabrication facility 2065 may then fabricate an integrated circuit that is based at least in part on the IP core design. The fabricated integrated circuit can be configured to perform operations in accordance with at least one embodiment described herein.

Figure 20B:
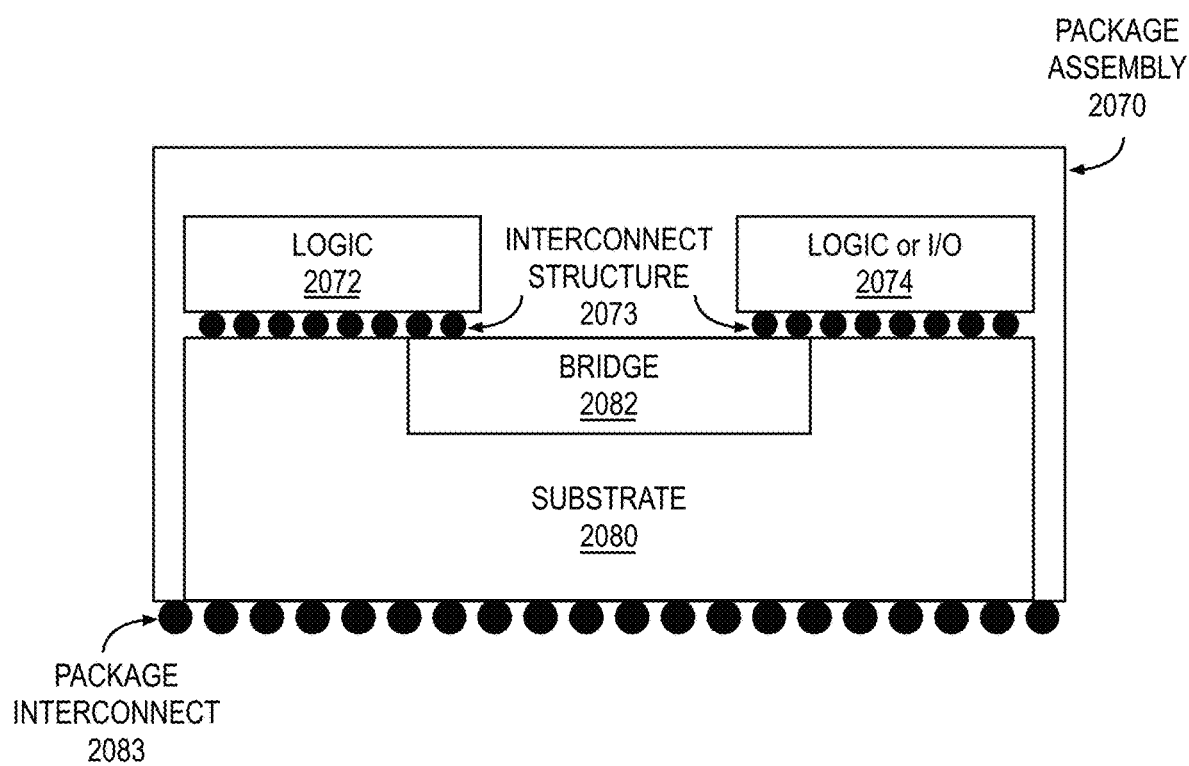

FIG. 20B illustrates a cross-section side view of an integrated circuit package assembly 2070, according to some embodiments described herein. The integrated circuit package assembly 2070 illustrates an implementation of one or more processor or accelerator devices as described herein. The package assembly 2070 includes multiple units of hardware logic 2072, 2074 connected to a substrate 2080. The logic 2072, 2074 may be implemented at least partly in configurable logic or fixed-functionality logic hardware and can include one or more portions of any of the processor core(s), graphics processor(s), or other accelerator devices described herein. Each unit of logic 2072, 2074 can be implemented within a semiconductor die and coupled with the substrate 2080 via an interconnect structure 2073. The interconnect structure 2073 may be configured to route electrical signals between the logic 2072, 2074 and the substrate 2080, and can include interconnects such as, but not limited to bumps or pillars. In some embodiments, the interconnect structure 2073 may be configured to route electrical signals such as, for example, input/output (I/O) signals and/or power or ground signals associated with the operation of the logic 2072, 2074. In some embodiments, the substrate 2080 is an epoxy-based laminate substrate. The substrate 2080 may include other suitable types of substrates in other embodiments. The package assembly 2070 can be connected to other electrical devices via a package interconnect 2083. The package interconnect 2083 may be coupled to a surface of the substrate 2080 to route electrical signals to other electrical devices, such as a motherboard, other chipset, or multi-chip module.

In some embodiments, the units of logic 2072, 2074 are electrically coupled with a bridge 2082 that is configured to route electrical signals between the logic 2072, 2074. The bridge 2082 may be a dense interconnect structure that provides a route for electrical signals. The bridge 2082 may include a bridge substrate composed of glass or a suitable semiconductor material. Electrical routing features can be formed on the bridge substrate to provide a chip-to-chip connection between the logic 2072, 2074.

Although two units of logic 2072, 2074 and a bridge 2082 are illustrated, embodiments described herein may include more or fewer logic units on one or more dies. The one or more dies may be connected by zero or more bridges, as the bridge 2082 may be excluded when the logic is included on a single die. Alternatively, multiple dies or units of logic can be connected by one or more bridges. Additionally, multiple logic units, dies, and bridges can be connected in other possible configurations, including three-dimensional configurations.

Figure 20C:
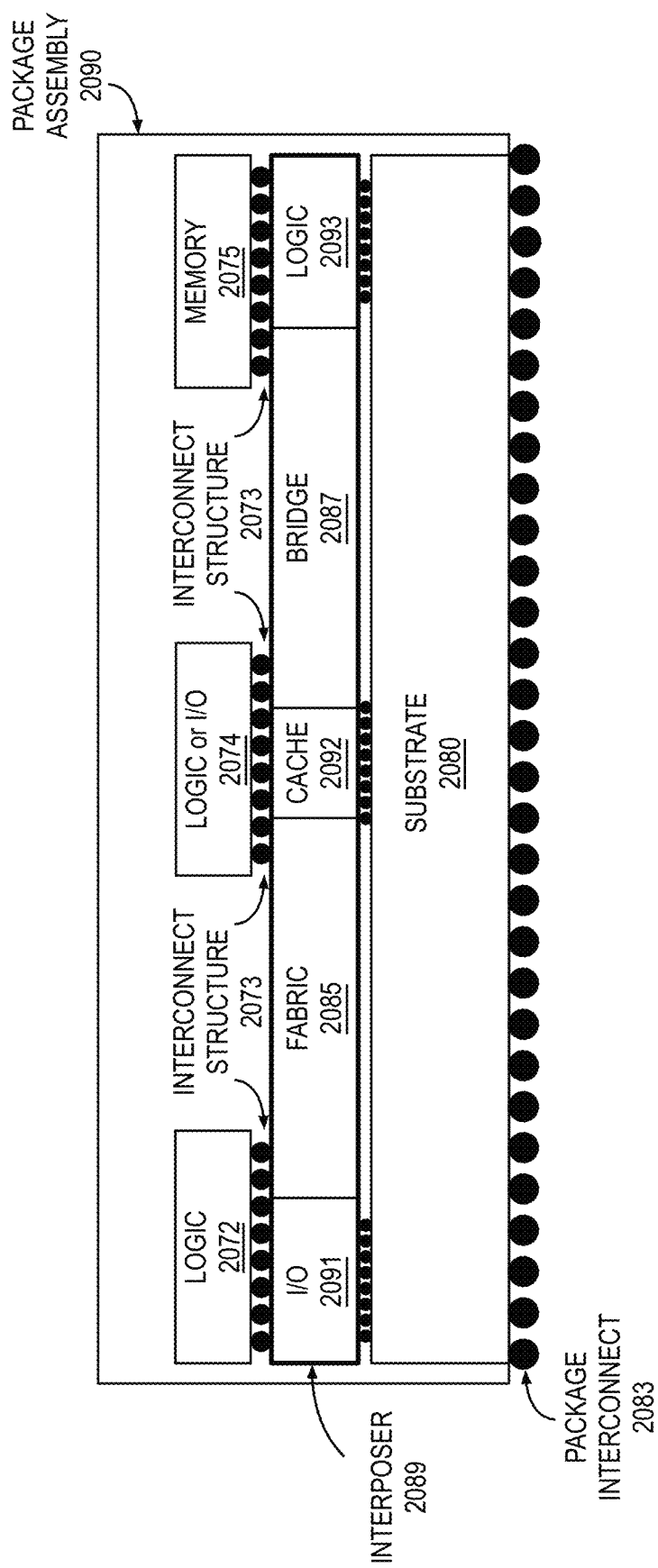

FIG. 20C illustrates a package assembly 2090 that includes multiple units of hardware logic chiplets connected to a substrate 2080. A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

In various embodiments a package assembly 2090 can include components and chiplets that are interconnected by a fabric 2085 and/or one or more bridges 2087. The chiplets within the package assembly 2090 may have a 2.5D arrangement using Chip-on-Wafer-on-Substrate stacking in which multiple dies are stacked side-by-side on a silicon interposer 2089 that couples the chiplets with the substrate 2080. The substrate 2080 includes electrical connections to the package interconnect 2083. In one embodiment the silicon interposer 2089 is a passive interposer that includes through-silicon vias (TSVs) to electrically couple chiplets within the package assembly 2090 to the substrate 2080. In one embodiment, silicon interposer 2089 is an active interposer that includes embedded logic in addition to TSVs. In such embodiment, the chiplets within the package assembly 2090 are arranged using 3D face to face die stacking on top of the silicon interposer 2089. The silicon interposer 2089, when an active interposer, can include hardware I/O logic 2091, cache memory 2092, and other hardware logic 2093, in addition to interconnect fabric 2085 and a silicon bridge 2087. The fabric 2085 enables communication between the various logic chiplets 2072, 2074 and the logic 2091, 2093 within the silicon interposer 2089. The fabric 2085 may be an NoC (Network on Chip) interconnect or another form of packet switched fabric that switches data packets between components of the package assembly. For complex assemblies, the fabric 2085 may be a dedicated chiplet enables communication between the various hardware logic of the package assembly 2090.

Bridge structures 2087 within the silicon interposer 2089 may be used to facilitate a point-to-point interconnect between, for example, logic or I/O chiplets 2074 and memory chiplets 2075. In some implementations, bridge structures 2087 may also be embedded within the substrate 2080. The hardware logic chiplets can include special purpose hardware logic chiplets 2072, logic or I/O chiplets 2074, and/or memory chiplets 2075. The hardware logic chiplets 2072 and logic or I/O chiplets 2074 may be implemented at least partly in configurable logic or fixed-functionality logic hardware and can include one or more portions of any of the processor core(s), graphics processor(s), parallel processors, or other accelerator devices described herein. The memory chiplets 2075 can be DRAM (e.g., GDDR, HBM) memory or cache (SRAM) memory. Cache memory 2092 within the silicon interposer 2089 (or substrate 2080) can act as a global cache for the package assembly 2090, part of a distributed global cache, or as a dedicated cache for the fabric 2085.

Each chiplet can be fabricated as separate semiconductor die and coupled with a base die that is embedded within or coupled with the substrate 2080. The coupling with the substrate 2080 can be performed via an interconnect structure 2073. The interconnect structure 2073 may be configured to route electrical signals between the various chiplets and logic within the substrate 2080. The interconnect structure 2073 can include interconnects such as, but not limited to bumps or pillars. In some embodiments, the interconnect structure 2073 may be configured to route electrical signals such as, for example, input/output (I/O) signals and/or power or ground signals associated with the operation of the logic, I/O and memory chiplets. In one embodiment, an additional interconnect structure couples the silicon interposer 2089 with the substrate 2080.

In some embodiments, the substrate 2080 is an epoxy-based laminate substrate. The substrate 2080 may include other suitable types of substrates in other embodiments. The package assembly 2090 can be connected to other electrical devices via a package interconnect 2083. The package interconnect 2083 may be coupled to a surface of the substrate 2080 to route electrical signals to other electrical devices, such as a motherboard, other chipset, or multi-chip module.

In some embodiments, a logic or I/O chiplet 2074 and a memory chiplet 2075 can be electrically coupled via a bridge 2087 that is configured to route electrical signals between the logic or I/O chiplet 2074 and a memory chiplet 2075. The bridge 2087 may be a dense interconnect structure that provides a route for electrical signals. The bridge 2087 may include a bridge substrate composed of glass or a suitable semiconductor material. Electrical routing features can be formed on the bridge substrate to provide a chip-to-chip connection between the logic or I/O chiplet 2074 and a memory chiplet 2075. The bridge 2087 may also be referred to as a silicon bridge or an interconnect bridge. For example, the bridge 2087, in some embodiments, is an Embedded Multi-die Interconnect Bridge (EMIB). In some embodiments, the bridge 2087 may simply be a direct connection from one chiplet to another chiplet.

Figure 20D:
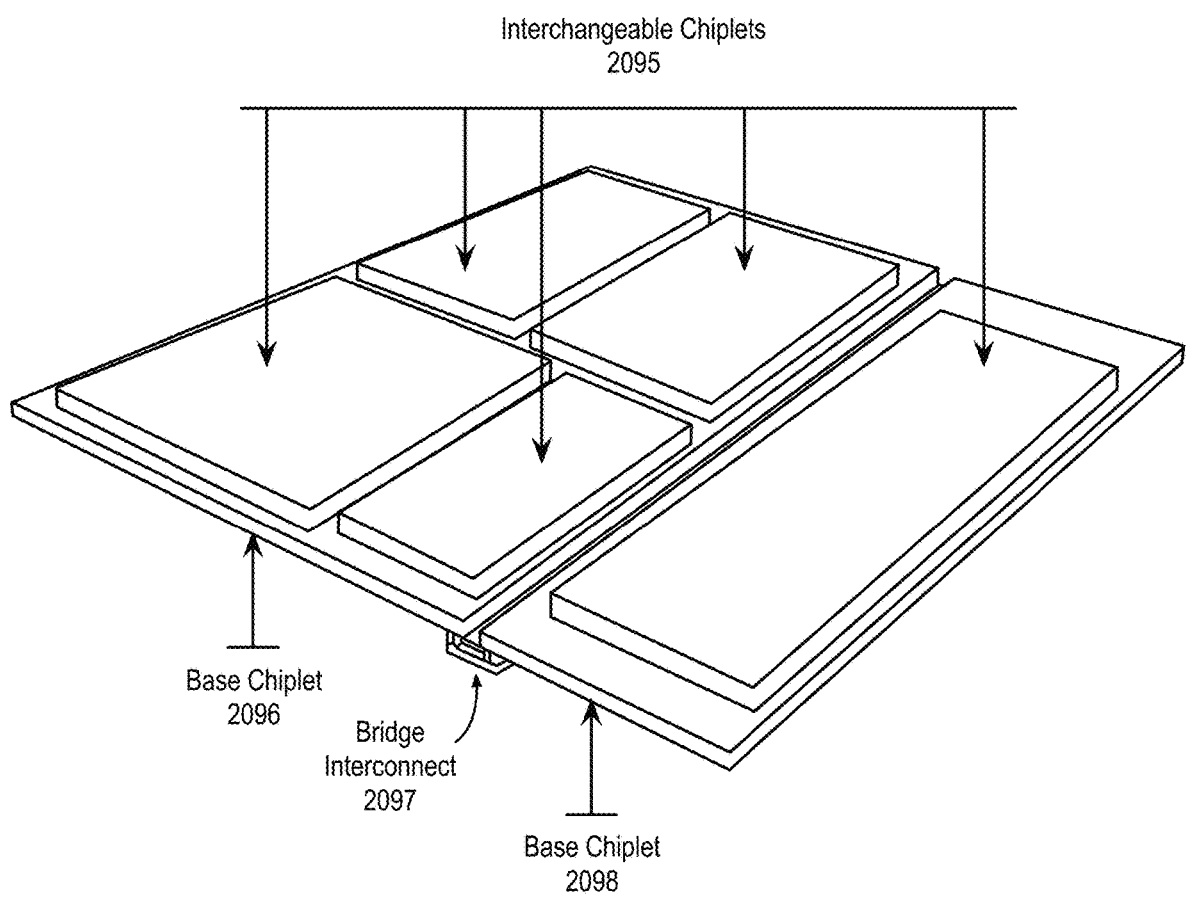

FIG. 20D illustrates a package assembly 2094 including interchangeable chiplets 2095, according to an embodiment. The interchangeable chiplets 2095 can be assembled into standardized slots on one or more base chiplets 2096, 2098. The base chiplets 2096, 2098 can be coupled via a bridge interconnect 2097, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 2096, 2098, which can be fabricated using a different process technology relative to the interchangeable chiplets 2095 that are stacked on top of the base chiplets. For example, the base chiplets 2096, 2098 can be fabricated using a larger process technology, while the interchangeable chiplets can be manufactured using a smaller process technology. One or more of the interchangeable chiplets 2095 may be memory (e.g., DRAM) chiplets. Different memory densities can be selected for the package assembly 2094 based on the power, and/or performance targeted for the product that uses the package assembly 2094. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Figure 21:
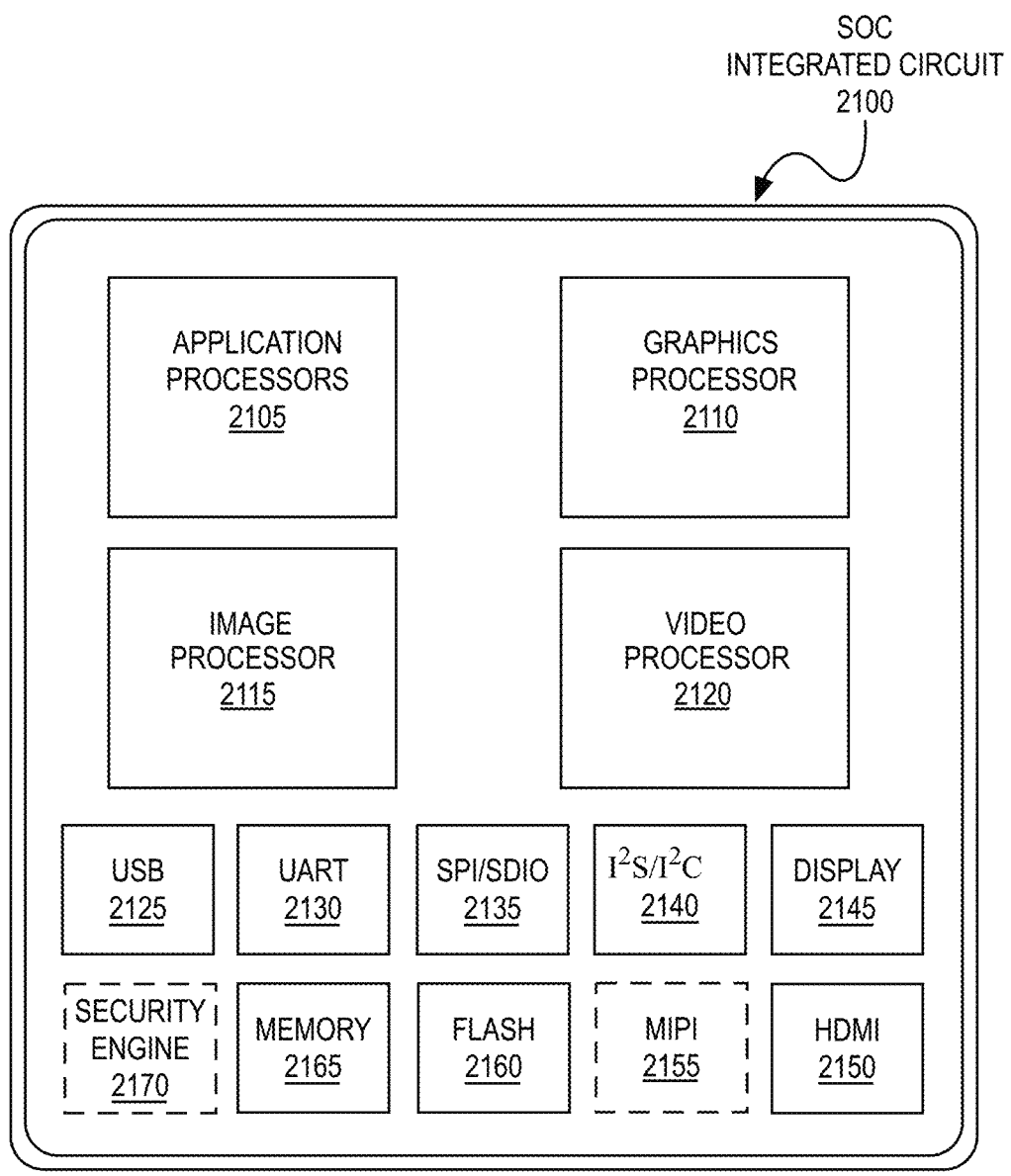
FIG. 21 illustrates an exemplary integrated circuit and associated processors that may be fabricated using one or more IP cores, according to various embodiments described herein.

FIG. 21 illustrates an exemplary integrated circuit and associated processors that may be fabricated using one or more IP cores, according to various embodiments described herein. In addition to what is illustrated, other logic and circuits may be included, including additional graphics processors/cores, peripheral interface controllers, or general-purpose processor cores. As shown in FIG. 21, an integrated circuit 2100 can include one or more application processors 2105 (e.g., CPUs), at least one graphics processor 2110, and may additionally include an image processor 2115 and/or a video processor 2120, any of which may be a modular IP core from the same or multiple different design facilities. Integrated circuit 2100 includes peripheral or bus logic including a USB controller 2125, UART controller 2130, an SPI/SDIO controller 2135, and an I²S/I²C controller 2140. Additionally, the integrated circuit can include a display device 2145 coupled to one or more of a high-definition multimedia interface (HDMI) controller 2150 and a mobile industry processor interface (MIPI) display interface 2155. Storage may be provided by a flash memory subsystem 2160 including flash memory and a flash memory controller. Memory interface may be provided via a memory controller 2165 for access to SDRAM or SRAM memory devices. Some integrated circuits additionally include an embedded security engine 2170.

References herein to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

In the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. Those skilled in the art will appreciate that the broad techniques of the embodiments described herein can be implemented in a variety of forms. Therefore, while the embodiments have been described in connection with examples thereof, the true scope of the embodiments should not be so limited since other modifications will become apparent to the skilled practitioner upon a study of the drawings, specification, and following claims.

What is claimed is:

1. A system on a chip integrated circuit (SoC) comprising:
graphics processing resources including one or more graphics processing cores;
a memory subsystem including a memory controller and a physical interface; and
circuitry configured to dynamically adjust a voltage and frequency of the memory subsystem based on a workload to be executed by the graphics processing resources, wherein to dynamically adjust the voltage and frequency of the memory subsystem includes to:
select, based on a parameter associated with the workload to be executed by the graphics processing resources, a voltage from a plurality of operational voltages enabled for the memory subsystem;
select a frequency from a plurality of operational frequencies enabled for the memory subsystem;
detect a beginning of a display refresh period; and
adjust the frequency of the memory subsystem to a selected frequency within the display refresh period.

2. The SoC of claim 1, the circuitry configured to:
train parameters of the memory subsystem for multiple combinations of the plurality of operational voltages and the plurality of operational frequencies; and
store trained parameters of the memory subsystem to a non-volatile memory of the SoC.

3. The SoC of claim 2, the circuitry configured to:
receive a workload demand for a workload to be executed by the graphics processing resources;
select a frequency from the plurality of operational frequencies based on the workload demand; and
adjust the frequency of the memory subsystem to the selected frequency.

4. The SoC of claim 3, the physical interface configured to couple a memory with the memory subsystem.

5. The SoC of claim 4, wherein to adjust the frequency of the memory subsystem to the selected frequency, the circuitry is configured to:
disable traffic to the memory controller;
disable communication between the memory controller and the physical interface;
wait for completion of pending read and write requests to complete;
signal the memory controller to change to the selected frequency;
re-enable traffic to the memory controller; and
re-enable communication between the memory controller and the physical interface.

6. The SoC of claim 5, wherein to change to the selected frequency, the memory controller is configured to:
place the memory coupled with the memory subsystem into a self-refresh mode;
set the physical interface to the selected frequency; and
retrain the physical interface while the memory coupled with the memory subsystem is in the self-refresh mode.

7. The SoC of claim 6, wherein to retrain the physical interface, the memory controller is configured to program the physical interface according to trained parameters associated with the selected frequency.

8. The SoC of claim 1, the circuitry configured to:
select a frequency from the plurality of operational frequencies based on a received workload demand;
determine a voltage associated with the selected frequency; and
adjust the voltage of the memory subsystem to the voltage associated with the selected frequency.

9. The SoC of claim 1, the circuitry additionally configured to dynamically adjust the voltage or frequency of the memory subsystem based on a power state of the SoC.

10. The SoC of claim 9, the circuitry configured to:
receive a request to adjust a power state of the SoC;
determine a voltage associated with power state;
determine a frequency associated with a determined voltage; and
adjust the voltage and frequency of the memory subsystem to the determined voltage and frequency.

11. A graphics processing system comprising:
a memory device; and
a graphics processor coupled with the memory device, the graphics processor including:
graphics processing resources including one or more graphics processing cores;
a memory subsystem including a memory controller and a physical interface; and
circuitry configured to dynamically adjust a voltage and frequency of the memory subsystem based on a workload to be executed by the graphics processing resources, wherein to dynamically adjust the voltage and frequency of the memory subsystem includes to:
select, based on a parameter associated with the workload to be executed by the graphics processing resources, a voltage from a plurality of operational voltages enabled for the memory subsystem;
select a frequency from a plurality of operational frequencies enabled for the memory subsystem;
detect a beginning of a display refresh period; and
adjust the frequency of the memory subsystem to a selected frequency within the display refresh period.

12. The graphics processing system of claim 11, the circuitry configured to:
train parameters of the memory subsystem for multiple combinations of the plurality of operational voltages and the plurality of operational frequencies; and
store trained parameters of the memory subsystem to a non-volatile memory of the graphics processing system.

13. The graphics processing system of claim 12, the circuitry configured to:
receive a workload demand for a workload to be executed by the graphics processing system;
select a frequency from the plurality of operational frequencies based on the workload demand; and
adjust the frequency of the memory subsystem to the selected frequency.

14. The graphics processing system of claim 13, the physical interface configured to couple a memory with the memory subsystem.

15. The graphics processing system of claim 14, wherein to adjust the frequency of the memory subsystem to the selected frequency, the circuitry is configured to:
disable traffic to the memory controller;
disable communication between the memory controller and the physical interface;
wait for completion of pending read and write requests to complete;
signal the memory controller to change to the selected frequency;
re-enable traffic to the memory controller; and
re-enable communication between the memory controller and the physical interface.

16. The graphics processing system of claim 15, wherein to change to the selected frequency, the memory controller is configured to:
place the memory coupled with the memory subsystem into a self-refresh mode;
set the physical interface to the selected frequency; and
retrain the physical interface while the memory coupled with the memory subsystem is in the self-refresh mode.

17. The graphics processing system of claim 16, wherein to retrain the physical interface, the memory controller is configured to program the physical interface according to trained parameters associated with the selected frequency.

18. The graphics processing system of claim 11, the circuitry configured to:
select a frequency from the plurality of operational frequencies based on a received workload demand;
determine a voltage associated with the selected frequency; and
adjust the voltage of the memory subsystem to the voltage associated with the selected frequency.

19. The graphics processing system of claim 11, the circuitry additionally configured to dynamically adjust the voltage or frequency of the memory subsystem based on a power state of the graphics processing system.

20. The graphics processing system of claim 19, the circuitry configured to:
receive a request to adjust a power state of the graphics processing system;
determine a voltage associated with power state;
determine a frequency associated with a determined voltage; and
adjust the voltage and frequency of the memory subsystem to the determined voltage and frequency.

* * * * *